United States Patent
Nakazawa et al.

(10) Patent No.: US 7,439,996 B2
(45) Date of Patent: *Oct. 21, 2008

(54) MEDICAL IMAGE RECORDING SYSTEM AND MEDICAL IMAGE RECORDING APPARATUS

(75) Inventors: Masayuki Nakazawa, Hachioji (JP); Akira Yamano, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 10/915,640

(22) Filed: Aug. 10, 2004

(65) Prior Publication Data

US 2005/0057638 A1 Mar. 17, 2005

(30) Foreign Application Priority Data

| Aug. 25, 2003 | (JP) | ............... 2003-300120 |
| Sep. 1, 2003 | (JP) | ............... 2003-308851 |
| Sep. 1, 2003 | (JP) | ............... 2003-308901 |

(51) Int. Cl.
*B41J 2/435* (2006.01)
*G06K 15/02* (2006.01)

(52) U.S. Cl. ..................... 347/224; 358/1.2

(58) Field of Classification Search ............... 347/110, 347/224; 358/1.2–1.4, 3.12, 451, 522, 528
See application file for complete search history.

(56) References Cited

U.S. PATENT DOCUMENTS

| 5,111,044 A * | 5/1992 | Agano ..................... 250/584 |
| 5,740,428 A | 4/1998 | Mortimore et al. |
| 5,917,536 A * | 6/1999 | Kunimoto et al. ........... 347/247 |
| 6,031,560 A * | 2/2000 | Wojcik et al. ............... 347/254 |
| 6,370,229 B1 * | 4/2002 | Tsuchino et al. ............ 378/165 |
| 6,806,487 B2 * | 10/2004 | Tamakoshi et al. .......... 250/586 |
| 6,847,697 B2 * | 1/2005 | Kurahashi ..................... 378/62 |
| 6,972,425 B2 * | 12/2005 | Tamakoshi et al. .......... 250/583 |
| 7,130,460 B2 * | 10/2006 | Nakazawa et al. .......... 382/128 |
| 2004/0170310 A1 * | 9/2004 | Kurahashi ................... 382/128 |
| 2004/0230613 A1 * | 11/2004 | Goldstein et al. ........ 707/104.1 |
| 2005/0008262 A1 * | 1/2005 | Komiya et al. .............. 382/305 |
| 2005/0046879 A1 * | 3/2005 | Nakazawa et al. ........... 358/1.2 |

FOREIGN PATENT DOCUMENTS

| JP | 63016766 | 1/1988 |
| JP | 02066623 | 3/1990 |
| JP | 2000332993 | 11/2000 |

* cited by examiner

*Primary Examiner*—Hai C Pham
(74) *Attorney, Agent, or Firm*—Lucas & Mercanti, LLP

(57) ABSTRACT

A medical image recording system for recording the medical image on a recording medium, including: an image data forming section that forms image data including medical image data of a radiographed object and supplementary information; and an image recording section that records the medical image on the basis of the medical image data on the recording medium, wherein the image recording section comprises a switching device for selecting the writing pitch at the time of the recording on the basis of the supplementary information.

24 Claims, 29 Drawing Sheets

FIG. 4

| READING PITCH / WRITING PITCH | 87.5μ | 87.5μ | 87.5μ | 50μ |
|---|---|---|---|---|
| 43.75μ | 2.0 A | 2.0 A | 2.0 A | 1.1 C |
| 25μ | 3.5 B | 3.5 B | 3.5 B | 2.0 A |

FIG. 9 (a)

| 0.00 | 0.00 | 0.00 | 0.00 |
|------|------|------|------|
| 0.00 | 0.00 | 0.00 | 0.00 |
| 0.00 | 0.00 | 1.00 | 0.00 |
| 0.00 | 0.00 | 0.00 | 0.00 |

FIG. 9 (b)

| 0.00 | 0.00 | -0.01 | 0.00 |
|------|------|-------|------|
| 0.00 | 0.00 | 0.20 | 0.00 |
| -0.01 | 0.20 | 0.63 | -0.03 |
| 0.00 | -0.01 | -0.03 | 0.00 |

FIG. 12

| INTERPOLATION MAGNIFICATION FACTOR | 0.80 | 0.90 | 0.95 | 1.00 | 1.05 | 1.10 | 1.20 | 1.30 | 1.40 | 1.50 |
|---|---|---|---|---|---|---|---|---|---|---|
| EVALUATION RESULT | 1 | 2 | 4 | 5 | 4 | 2 | 2 | 2 | 3 | 3 |

| INTERPOLATION MAGNIFICATION FACTOR | 1.60 | 1.70 | 1.80 | 1.90 | 2.00 | 2.20 | 2.40 | 2.60 | 2.80 | 3.00 |
|---|---|---|---|---|---|---|---|---|---|---|
| EVALUATION RESULT | 3 | 3 | 4 | 4 | 5 | 4 | 4 | 5 | 5 | 5 |

[ EVOLUATION STANDARDS ]

5 EXCELLENT
4 GOOD
3 FAIR
2 POOR
1 VERY POOR

FIG. 15

| | SWITCHABLE WRITING PITCH (μ) | READING PITCH OF INPUT IMAGE (μ) | | | | | | | |
|---|---|---|---|---|---|---|---|---|---|
| | | 30 | 40 | 50 | 60 | 70 | 80 | 90 | 100 |
| COMPARATIVE EXAMPLE A | 50 | 0.60 E | 0.80 E | 1.00 S | 1.20 D | 1.40 C | 1.60 C | 1.80 B | 2.00 S |
| COMPARATIVE EXAMPLE B | 40 | 0.75 D | 1.00 S | 1.25 D | 1.50 C | 1.75 C | 2.00 S | 2.25 B | 2.50 A |
| EMBODIMENT C | 30 / 60 | 1.00 S | 1.33 D | 1.67 C | 2.00 S | 2.33 B | 2.67 A | 3.00 S | 3.33 A |
| EMBODIMENT D | 30 / 40 | 1.00 S | 1.00 S | 1.67 C | 2.00 S | 2.33 B | 2.00 S | 3.00 S | 3.33 A |
| EMBODIMENT E | 30 / 40 / 50 | 1.00 S | 1.00 S | 1.00 S | 2.00 S | 2.33 B | 2.00 S | 3.00 S | 2.00 S |

[CRITERIA]
- S  INTEGRAL MULTIPLE
- A  2.5 TIMES OR MORE
- B  0.95 THROUGH 1.05 TIMES OR 1.8 THROUGH 2.5 TIMES OR MORE
- C  1.4 THROUGH 1.8 TIMES
- D  1.05 THROUGH 1.4 TIMES
- E  UP TO 0.95 TIMES

| APPARATUS TYPE | CR | MRI | CR | MAMMOGRAPHY |
|---|---|---|---|---|
| RECORDING MEDIUM SIZE | 14 X 17 -INCH SIZE | 14 X 17 -INCH SIZE | 14 X 17 -INCH SIZE | 8 X 10 -INCH SIZE |
| READING PIXEL SIZE | 87.5 μ | 87.5 μ | 87.5 μ | 50 μ |
| RECORDING PIXEL SIZE | 43.75 μ | 43.75 μ | 43.75 μ | 25 μ |
| TRAY AS OUTPUT DESTINATION | TRAY T2 | TRAY T2 | TRAY T2 | TRAY T1 |

FIG. 26

| APPARATUS TYPE | CR | MRI | CR | MAMMOGRAPHY |
|---|---|---|---|---|
| RECORDING MEDIUM SIZE | 11 X 14 -INCH SIZE | 11 X 14 -INCH SIZE | 11 X 14 -INCH SIZE | 11 X 14 -INCH SIZE |
| READING PIXEL SIZE | 87.5 μ | 87.5 μ | 87.5 μ | 50 μ |
| RECORDING PIXEL SIZE | 43.75 μ | 43.75 μ | 43.75 μ | 25 μ |
| TRAY AS OUTPUT DESTINATION | TRAY T4 | TRAY T4 | TRAY T4 | TRAY T5 |

262

MEDICAL IMAGE RECORDING SYSTEM AND MEDICAL IMAGE RECORDING APPARATUS

FIELD OF THE INVENTION

The present invention relates to an image system for recording a medical image on a recording medium, and an medical image recording apparatus.

BACKGROUND OF THE INVENTION

In recent years, efforts have been made to develop a method for getting a medical radiographic image without using a radiographic film made of silver halide photosensitive material. For example, there has been widespread use of Computed Radiography apparatus (hereinafter abbreviated as "CR") that utilizes the imaging plate mainly consisting of a stimulable phosphor to pick up photostimulated luminescence using excitation light after storing the radiographic image once, and applies photoelectric conversion to this light, thereby acquiring image signals.

Further, in recent years, a proposal has been made of a Flat Panel Detector (hereinafter abbreviated as "FPD") for reading radiographic image information by a combination of a radiographic phosphor, a radiographic conductor and a two-dimensional semiconducting detector such as a TFT switching device.

Further, to meet particular requirements of each part of the body part to be radiographed and the purpose of radiographing, a computed tomography apparatus (hereinafter abbreviated as "CT"), a magnetic resonance imaging apparatus (hereinafter abbreviated as "MRI (M)") and a mammographic apparatus (these apparatuses will be collectively called "medical image generation apparatus" hereinafter) are also employed.

These medical images are often diagnosed by the method of observing the hard copy where image information is recorded on a transmission recording medium and reflective recording medium. A medical image recording apparatus for recording medical image information on the recording medium includes the well-known method of recording an image by laser exposure on a transmission recording medium using a silver halide recording material. This method permits a monochromatic image to be rendered in excellent gradations. At the same time, it provides an advanced level of diagnostic capacity by recording it on a transmission recording medium and observing under transmitted light. Various types of medical image recording apparatuses have been developed. A thermal recording apparatus using a thermal head and heat mode laser and a photosensitive thermal color development image recording apparatus using a photosensitive thermal development recording material are also known, in addition to the method of using a silver halide recording medium requiring the prior art wet type processing.

In recent years, the aforementioned medical image generation apparatus and medical image recording apparatus are linked to a system for maintaining information in a hospital (hereinafter referred to as "HIS" (Hospital Information System)), or a system for managing information in a radiology department (hereinafter referred to as "RIS" (Radiology Information System)), via the communications network such as LAN (Local Area Network). For example, the medical image generated in various types of medical image generation apparatuses is sent to the medical image recording apparatus, where the medical image is recorded on a recording medium and is used for diagnosis.

In this case, a medical image generation apparatus selected from various types has been used in conformity to the particular site to be radiographed and the particular purpose of radiographing, whereas a medical image recording apparatus of the type conforming to the particulate site to be radiographed and the purpose of radiographing has not been used, in the prior art. To put it another way, in the prior art medical image recording apparatus, a plurality of trays are provided in one type of apparatus, and trays for accommodating the recording mediums of difference size are selected in conformity to the site to be radiographed and the purpose of radiographing. Then the medical image is recorded and outputted. Alternatively, in a medical image recording apparatus provided with a plurality of trays, a correction table storage means for storing the conversion table used for conversion of the image signal for each tray is provided, and the conversion table is corrected to suited for the photosensitive material loaded in each tray, thereby allowing image recording to be achieved at the density suited for the photosensitive material. An optical scanning recording apparatus characterized by this arrangement is also known, as disclosed in Patent Document 1, for example.

Developments are also being made to produce various types of image recording apparatuses for performing image recording using the image data obtained by a CR and FPD. The image captured by the CR and FPD is frequently required to be outputted in the same size as the affected area of a patient as a subject (life size) according to the conventional practice of simple radiographing.

In this case, when a life-sized image of the affected area is to be outputted, processing of interpolation magnification must be applied, if there is a difference between the size of the image scanned by the CR and the size of the image recorded by the image recording apparatus for creating a hardcopy and outputting it. For example, when the size of the scanned image is 87.5 microns and the size of the image recorded by the image recording apparatus is 80 microns, processing of interpolation magnification must be applied to scale up approximately 1.109 time in order to output the life-sized image.

The frequency characteristics of the image are usually deteriorated by processing of interpolation magnification based on such a non-integral multiple by spline interpolation, with the result that sharpness of the image is deteriorated. This must be avoided in a diagnostic image. If processing of interpolation magnification based on such a non-integral multiple by replication is applied, image distortion will be clearly visible. This must also be avoided in a diagnostic image.

A method is proposed to establish the relationship of an integral multiple between the size of the scanned image (reading pitch) and size of the recorded image (writing pitch), according to the thermal recording technique where the size of the recorded image at the time of hard copying is defined uniquely by the thermal head, as disclosed, for example, in Patent Document 2.

Apart from the above, a configuration is disclosed, for example, in Patent Document 3 wherein, when an image is recorded by the image recording apparatus using the image signal inputted from a plurality of image signal sources, a γ correction table corresponding to a plurality of image signal sources having different γ characteristics is stored; the γ correction table corresponding to the image signal source is set by specifying an identification number; and this image γ correction table is used to record the image signal.

Patent Document 1: Official Gazette of Japanese Patent Tokkaihei 7-250229

Patent Document 2: Official Gazette of Japanese Patent Tokkai 2000-332993

Patent Document 3: Official Gazette of Japanese Patent Tokkaihei 2-66623

In recent years, a system is composed by connecting a CR apparatus or FPD apparatus with an image recording apparatus via the network, and image data items having different reading pitches are present in a hospital equipped with this system. However, the image recording apparatus described in the Patent Document 2 is incapable of switching among multiple writing pitches and outputting the life-sized images having different reading pitches.

Further, the image recording apparatus described in Patent Document 3 provides a method for recording an image by applying γ correction corresponding to an image generating apparatus having generated this image data. However, there is no disclosure of the size of a recorded image (a writing pitch).

An object of the present invention is to provide means for recording an image through switching of multiple writing pitches and processing of interpolation to image data.

SUMMARY OF THE INVENTION

These and other objects are achieved in accordance with that:

a medical image recording system for recording the medical image on a recording medium, comprising: an image data forming apparatus that forms image data including medical image data of a radiographed object and supplementary information; an image recording apparatus that records the medical image on the basis of the medical image data on the recording medium, wherein the image recording apparatus comprises a switching device for switching the writing pitch at the time of the recording on the basis of the supplementary information.

BRIEF DESCRIPTION OF THE DRAWINGS

FIG. 4 is a drawing showing the relationship of the interpolation magnification factor in conformity to the combination between a reading pitch and writing pitch;

FIGS. 9(a) and 9(b) are a diagram showing an example of interpolation coefficient, wherein (a) shows the interpolation coefficient in calculating the pixel data of the pixel PX1 shown in FIG. 8, while (b) shows the interpolation coefficient for calculating the pixel data related to the pixel PX2 given in FIG. 8;

FIG. 12 is a table representing the result of visual observation of the interpolation magnification factor;

FIG. 15 is a diagram showing interpolation magnification factor of the reading pitch with respect to the writing pitch, and the evaluation thereof;

FIG. 25 is a diagram showing an example of the data configuration of the table 261 stored in the control section 126 of the image recording apparatus 10A;

FIG. 26 is a diagram showing an example of the data configuration of the table 262 stored in the control section 126 of the image recording apparatus 10A.

DETAILED DESCRIPTION OF THE PREFERRED EMBODIMENT

Figure 1:
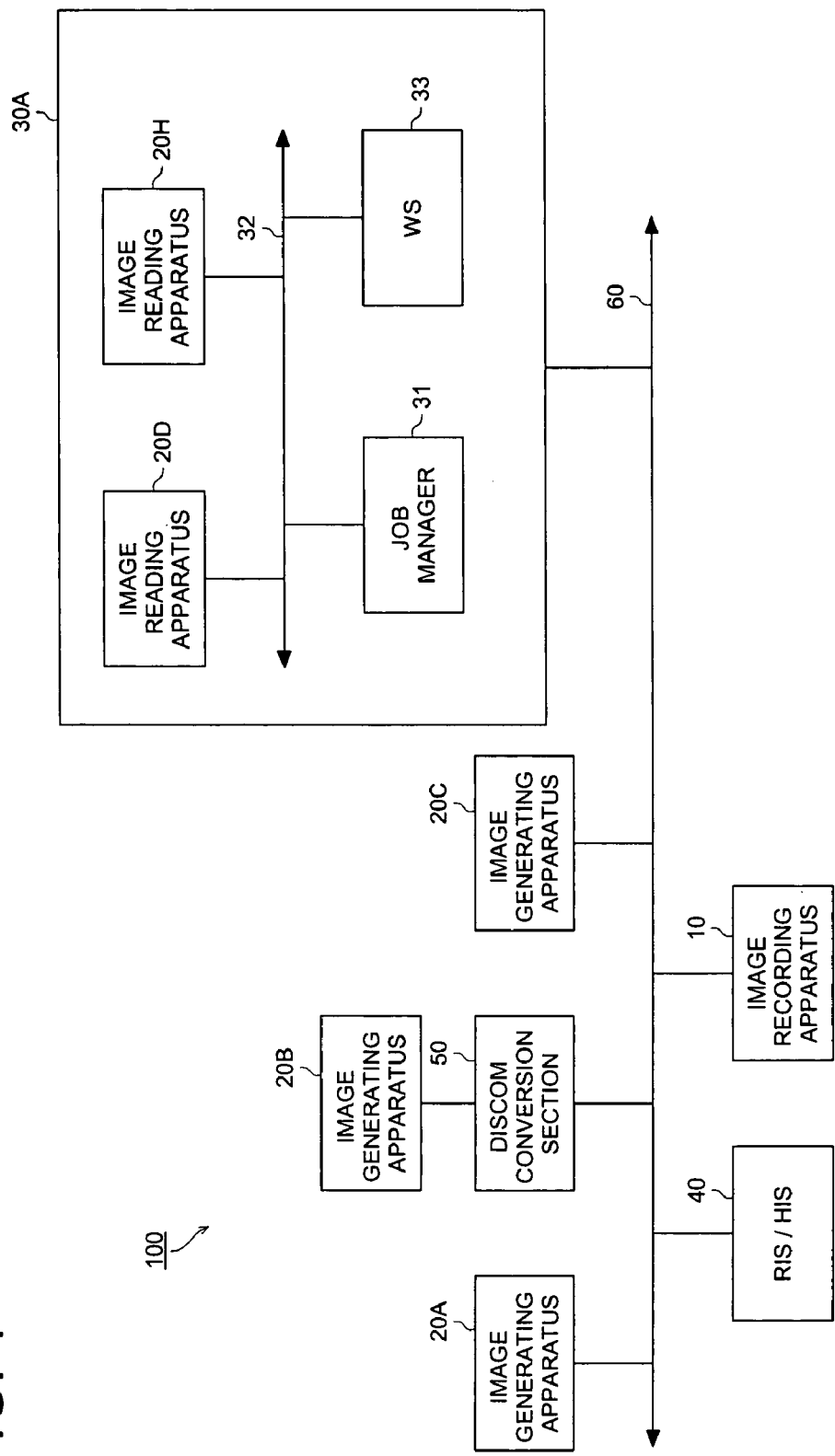
FIG. 1 is a block diagram representing a medical image recording system 100 as a first embodiment of the present invention.

The present invention will be described as follows.

(1) A medical image recording system wherein an image recording apparatus and a plurality of image (generating/forming) apparatuses are connected, and the image of the image data inputted from the image generating apparatuses is recorded by the image recording apparatus, the aforementioned medical image recording system characterized in that the image generating apparatus comprises:

a first communication section for communication with the image recording apparatus;

an image generating section for generating an image data of a subject; and a first control section for allowing the image generating section to generate image data at a predetermined reading pitch; adding the information on the writing pitch used to record the image of the image data, to the information attached to the image data; and sending this data to the image recording apparatus through the first communication section the data;

the aforementioned image generating apparatus comprises:

a second communication section for communicating with the image generating apparatus;

an image recording section, capable of recording an image at different writing pitches, for recording an image on a recording medium at a writing pitch selected from among a plurality of writing pitches; and a second control section for receiving image data from the image generating section through the second communication section; determining the writing pitch to be used to record the image of this image data, from the aforementioned multiple writing pitches, based on the information attached to this image data, and allowing the image recording section to record the data of the image data at the determined writing pitch.

(2) A medical image recording system wherein an image generating apparatus and an image recording apparatus are connected, and the image of the image data inputted from the image generating apparatus is recorded by the image recording apparatus, the aforementioned medical image recording system characterized in that the image generating apparatus comprises:

a first communication section for communication with the image recording apparatus;

an image generating section for generating an image data of a subject; and a first control section for determining a predetermined reading pitch selected from a plurality of reading pitches, allowing the image generating section to generate image data at this reading pitch, adding the information on the writing pitch used to record an image on the image data, to the information attached to the image data, and sending the image data to the image recording apparatus through the first communication section; and the aforementioned image recording apparatus comprises:

a second communication section for communicating with the image generating apparatus;

an image recording section, capable of recording an image at different writing pitches, for recording an image on a recording medium at a writing pitch selected from among a plurality of writing pitches; and a second control section for receiving image data from the image generating section through the second communication section, determining the writing pitch to be used to record the image of this image data, from the aforementioned multiple writing pitches, based on the information attached to this image data, and allowing the image recording section to record the image of the image data at the determined writing pitch.

(3) The medical image recording system described in (1) or (2) wherein, if there is a combination between the reading pitch and writing pitch where the reading pitch of the image generating apparatus is an integral multiple of writing pitch of the image recording apparatus, the second control section determines the writing pitch of this combination as a writing pitch used to record the image of the image data.

(4) The medical image recording system described in (1) or (2) wherein the second control section determines the writing pitch used to record the image of the image data, based on the interpolation magnification factor from the generated image to the recorded image.

(5) The medical image recording system described in (4) wherein, if there is a combination between the reading pitch and interpolation magnification factor wherein the value obtained by dividing the reading pitch of the image generating apparatus by the interpolation magnification factor is an integral multiple, the second control section determines the writing pitch of this combination as a writing pitch to be used to record the image of the image data.

(6) The medical image recording system described in any one of (1) through (5) wherein the aforementioned image generating apparatus is connected with the image recording apparatus via the network.

(7) A medical image recording system wherein an image generating apparatus is connected with a plurality of image recording apparatuses of a management apparatus; the image data inputted from the image generating apparatus is distributed to the image recording apparatus determined by the management apparatus; and an image is recorded on a recording medium by the image recording apparatus to which the image has been distributed;

the aforementioned medical image recording system characterized in that the aforementioned image recording apparatuses record the image of the image data at writing pitches different for each image recording apparatus, and the aforementioned image generating apparatus comprises:

a first communication section for communication with the image recording apparatus;

an image generating section for generating an image data of a subject; and a first control section for determining a predetermined reading pitch selected from a plurality of reading pitches; allowing the image generating section to generate image data at this reading pitch; adding the information on the writing pitch used to record an image on the image data, to the information attached to the image data; and sending the image data to the image recording apparatus through the first communication section;

the aforementioned management apparatus comprises:

a management side communication section for communicating with the image generating apparatus and image recording apparatus;

a management side control section for receiving image data from the image generating apparatus through the management side communication section, determining the writing pitch used to record the image of the image data from a plurality of writing pitches, based on the information attached to the image data, determining the image recording apparatus corresponding to the determined writing pitch and sending the image data to the determined image recording apparatus through the management side communication section; the aforementioned image recording apparatus comprises:

a second communication section for communicating with the image generating apparatus;

an image recording section for recording an image on a recording medium at a predetermined writing pitch; and a second control section for receiving image data from the management section through the second communication section, and allowing the image recording section to record the image of the image data at the determined writing pitch.

(8) The medical image recording system described in (7) wherein, if there is a combination between the reading pitch and writing pitch such that the reading pitch of the image generating apparatus is an integral multiple of writing pitch of the image recording apparatus, the management side control section determines the image recording apparatus corresponding to the writing pitch of this combination.

(9) The image recording apparatus described in (7) wherein the management side control section determines the writing pitch used to record the image of the image data, based on the interpolation magnification factor from the generated image to the recorded image, and determines the image recording apparatus corresponding to the writing pitch.

(10) The image recording apparatus described in (9) wherein, if there is a combination between the reading pitch and a magnification ratio of radiography such that the value obtained by dividing the reading pitch of the image generating apparatus by the magnification ratio of radiography is an integral multiple, the management side control section determines the image recording apparatus corresponding to the writing pitch of this combination.

(11) The medical image recording system described in any one of (7) through (10) wherein the aforementioned image generating apparatus and image recording apparatus are connected through the network.

(12) The medical image recording system described in any one of (1), (2) and (7) wherein there is a combination between the reading pitch and writing pitches such that the reading pitch of the image generating apparatus is an integral multiple of writing pitch of the image recording apparatus.

(13) The medical image recording system described in any one of (1), (2) and (7) wherein there is a combination between the reading pitch and interpolation magnification factor where the value obtained by dividing the reading pitch of the image generating apparatus by the interpolation magnification factor from the generated image to the recorded image is an integral multiple.

(14) The medical image recording system described in any one of (1) through (13) wherein the aforementioned supplementary information includes at least one of radiographing condition information indicating the radiographing conditions of a subject, information on the usage of image data, reading pitch information of the image generating apparatus having generated the image data, and information on interpolation magnification factor of image data.

(15) The medical image recording system described in any one of (1) through (14) wherein a plurality of the aforementioned writing pitches are two or more different types of writing pitches where $P1<P2<\ldots<Pn$ ($n\geq 2$), and $1.0<(Pi/P1)<1.9$ is satisfied in at least one of i ($i=2, 3, \ldots, n$).

(16) The medical image recording system described in (15) wherein $1.1<(Pi/P1)<1.7$ is satisfied at least one of i ($i=2, 3, \ldots, n$).

(17) The medical image recording system described in any one of (1) through (16) wherein at least three writing pitches are used.

(18) The medical image recording system described in any one of (1) through (17) wherein the aforementioned second control section allows the image recording section to record the writing pitch used to record the image of the image data, together with the image data, on the recording medium.

(19) The medical image recording system described in any one of (1) through (18) wherein the image recording section records the image data on a recording medium according to the photothermal silver halide method.

According to the invention described in (1), an image recording apparatus determines the writing pitch used to record the image of the image data, based on the information attached to the image data received from a plurality of image generating apparatuses, interpolates the image data at this writing pitch and records the image on a recording medium. This arrangement ensures image recording, wherein deterioration of the image of the image data generated by a plurality of image generating apparatuses is minimized by a preferable writing pitch selected from a plurality of writing pitches, based on the supplementary information.

According to the invention described in (2), an image generating apparatus determines a predetermined reading pitch from multiple reading pitches, generates image data at the determined reading pitch and adds supplementary information to this image data. The image recording apparatus determines the writing pitch to be used to record the image of the image data, based on the information attached to the image data received from the image generating apparatus, interpolates the image data at the writing pitch, and records the image on a recording medium. This arrangement ensures recording of the image data generated by the image generating apparatus using a plurality of reading pitches, wherein deterioration of image quality is minimized by a writing pitch conforming to the supplementary information selected from multiple writing pitches.

According to the invention described in (3), if there is a combination where the reading pitch of the image generating apparatus is an integral multiple of writing pitch of the image recording apparatus, the writing pitch of this combination is determined as the writing pitch used to record the data image having multiple writing pitches. This configuration ensures an image to be recorded, wherein the deterioration of image quality is minimized by a more preferable writing pitch conforming to this combination selected from multiple writing pitches.

According to the invention described in (4), the writing pitch used to record the image of the image data is determined, based on the interpolation magnification factor. This arrangement allows the image to be recorded, wherein deterioration of image quality is minimized by a preferable writing pitch based on the interpolation magnification factor selected from multiple writing pitches.

According to the invention described in (5), if there is a combination wherein the value obtained by dividing the reading pitch by the interpolation magnification factor is an integral multiple, the writing pitch corresponding to this combination is determined as a writing pitch to be used to record the image. This configuration allows the image to be recorded, wherein deterioration of image quality is minimized by a more preferable writing pitch conforming to the combination selected from multiple writing pitches.

According to the invention described in (6), the image generating apparatus is connected with the image recording apparatus via the network. This permits a preferred and varied communication connection configuration to be formed.

According to the invention described in (7), the image generating apparatus generates the image data at a predetermined reading pitch and adds supplementary information to the image data; and the management apparatus determines the writing pitch to be used to record the image of the image data, based on the information attached to the image dada received from the image generating apparatus, and sends the image data to the image recording apparatus corresponding to the writing pitch. The image recording apparatus applies interpolation to the image data received from the management apparatus, at a predetermined writing pitch. This arrangement allows the image recording apparatus to record the image of the image data generated by the image generating apparatus, in the image recording apparatus corresponding to a preferable writing pitch conforming to the supplementary information selected from multiple image recording apparatuses, where the image quality is minimized at a predetermined pitch.

According to the invention described in (8), if there is a combination where the reading pitch of the image generating apparatus is an integral multiple of writing pitch of the image recording apparatus, the image recording apparatus corresponding to the writing pitch of this combination is determined. This configuration allows the image to be recorded, wherein deterioration of image quality is minimized by a more preferable writing pitch conforming to the combination selected from multiple writing pitches.

According to the invention described in (9), the image recording apparatus corresponding to the writing pitch used to record the image of the image data is determined based on the interpolation magnification factor. This configuration allows the image to be recorded, wherein deterioration of image quality is minimized by a preferable writing pitch conforming to the interpolation magnification factor, selected from multiple writing pitches.

According to the invention described in (10), an image recording apparatus is determined which corresponds to the writing pitch of the combination where the value obtained by dividing the reading pitch by the magnification ratio of radiography is an integral multiple. This configuration allows the image to be recorded by a more preferable writing pitch without deterioration of image quality when the image obtained by magnification is recorded at a life-size.

According to the invention described in (11), the image generating apparatus and image recording apparatus are connected through the network. This permits a preferred and varied communication connection configuration to be formed.

According to the invention described in (12), there is a combination where the reading pitch of the image generating apparatus is an integral multiple of writing pitch of the image recording apparatus. This permits the writing pitch of this combination to be determined, and allows the image of the image data to be recorded, wherein deterioration of image quality is minimized by a more preferable writing pitch selected from multiple writing pitches.

According to the invention described in (13), there is a combination where the value obtained by dividing the reading pitch by the interpolation magnification factor is an integral multiple. This permits the writing pitch corresponding to this combination to be determined, and allows the image of the image data to be recorded, wherein deterioration of image quality is minimized by a more preferable writing pitch conforming to the combination selected from multiple writing pitches.

According to the invention described in (14), the supplementary information includes at least one of radiographing condition information, information on the usage of image data, reading pitch information of the image generating apparatus, and information on interpolation magnification factor of image data. This allows a preferable writing pitch to be determined, conforming to at least one of radiographing condition, usage of image data, reading pitch and interpolation magnification factor.

According to the invention described in (15), at least one of a plurality of writing pitches satisfies $1.0<(Pi/P1)<1.9$. Even if deterioration of the image quality occurs at the minimum writing pitch $P1$, deterioration of image quality is reduced using other writing pitches $Pi$, thereby interpolating the image data.

According to the invention described in (16), at least one of multiple writing pitches satisfies $1.1<(Pi/P1)<1.8$. Even if deterioration of the image quality occurs at the minimum writing pitch $P1$, deterioration of image quality is reduced using other writing pitch $Pi$, thereby interpolating the image data in such a way that there will be no overlap in the interpolation magnification factor range, wherever possible.

According to the invention described in (17), there are at least three writing pitches. This arrangement provides interpolation of image data corresponding to a wide range of reading pitches at a preferable writing pitch, wherein deterioration of image quality is minimized.

According to the invention described in (18), the writing pitch together with the image data are recorded on the recording medium. This permits the reading pitch to be checked by an observer of the image recorded on the recording medium.

According to the invention described in (19), the image data is recorded on the recording medium by the photothermal silver halide method. This arrangement provides recording of a medical image suitable for diagnosis.

(2-1) A medical image recording system wherein an image (generating/forming) apparatus and an image recording apparatus are connected, and the image data inputted from the image generating apparatus is recorded by the image recording apparatus, wherein the aforementioned image recording apparatus comprises:

an image recording section, capable of recording an image at different writing pitches, for recording an image on a recording medium at a writing pitch selected from among a plurality of writing pitches;

a setting section for setting the writing pitch to be used to record an image selected from a plurality of the aforementioned writing pitches, as writing pitch information for each image generating apparatus for generating image data;

a determining section for determining the writing pitch used to record the image of the image data, based on the writing pitch information set by the setting section and the information on the type of the image generating apparatus having generated the inputted image data; and a control section for allowing the image recording section to record the image of the image data according to the writing pitch determined by the determining section.

(2-2) The image recording system described in (2-1) further including a storage section for storing writing pitch information set by the aforementioned setting section in a form associated with the image generating apparatus; wherein the aforementioned determining section determines the writing pitch to be used to record the image of the image data, based on the writing pitch information stored by the storage section and the information on the type of the image generating apparatus having generated the inputted image data.

(2-3) The image recording system described in (2-1) further including a mode setting section for setting either a variable writing pitch mode for determining the writing pitch in response to the information on the type of the image generating apparatus, or a fixed writing pitch mode for determining a predetermined writing pitch independently of the information on the type of the image generating apparatus, wherein image recording system is further characterized by determining the writing pitch used to record the image of the image data, based on the mode set by the aforementioned mode setting section, and the writing pitch information set by the setting section, and the information on the type of the image generating apparatus of the image generating apparatus where the image data has been inputted.

(2-4) The image recording system described in (2-1) further characterized in that the setting section sets the writing pitch information for a plurality of writing pitches with respect to at least one type of image generating apparatus, and the determining section determines the writing pitch used to record the image of the image data selected from a plurality of the aforementioned writing pitches based on the information on other conditions.

(2-5) A medical image recording system wherein an image generating apparatus and an image recording apparatus are connected, and the image data inputted from the image generating apparatus is recorded by the image recording apparatus, wherein the image data inputted from the image generating apparatus contains the supplementary information on the writing pitch to be used to record the image of the image data, and the aforementioned medical image recording system comprises:

an image recording section, capable of recording an image at different writing pitches, for recording an image on a recording medium at a writing pitch selected from among a plurality of writing pitches;

a determining section for determining the writing pitch used to record the image data, based on the supplementary information of the inputted image data; and a control section for allowing the image recording section to record the image of the image data according to the writing pitch determined by the determining section.

(2-6) The image recording system described in (2-5) further including a mode setting section for setting either a variable writing pitch mode for determine the writing pitch to be used to record the image data in response to supplementary information, or a fixed writing pitch mode for determining a predetermined writing pitch independently of the supplementary information, wherein the determining section determines the writing pitch to be used to record the image of the image data, based on the mode set by the mode setting section and the supplementary information of the inputted image data.

(2-7) The image recording system described in (2-5) or (2-6) wherein the supplementary information includes at least one of radiographing condition information indicating the radiographing conditions of a subject, information on the usage of image data, reading pitch information of the image generating apparatus having generated the image data, and information on interpolation magnification factor of image data.

(2-8) The image recording system described in any one of (2-1) through (2-7) wherein there are at least three writing pitches.

(2-9) The image recording system described in any one of (2-1) through (2-8) wherein the aforementioned control section allows the image recording section to record the writing pitch used to record the image of the image data together with the image data, on the recording medium.

(2-10) The image recording system described in any one of (2-1) through (2-9) wherein the image recording section records the image data on a recording medium according to the photothermal silver halide method.

According to the invention described in (2-1), the writing pitch used to record the image of the image data is determined based on the writing pitch information and the information on the type of the image generating apparatus having generated the image data to be recorded, and the image data to be recorded is interpolated by the writing pitch. This configuration ensures the image to be recorded, wherein the deterioration of image quality is minimized by the preferable writing pitch conforming to the type of the image generating apparatus, selected from a plurality of writing pitches.

According to the invention described in (2-2), the writing pitch information is stored in the storage section. This reduces the workload in creating or modifying the writing pitch information.

According to the invention described in (2-3), a variable writing pitch mode or a fixed writing pitch mode is set, thereby determining the writing pitch to be used to record the image of the image in a flexible manner, depending on conformance or non-conformance to the type of the image generating apparatus.

According to the invention described in (2-4), a preferable writing pitch can be selected for one image generating apparatus, from among a plurality of writing pitches, based on the information on other conditions.

According to the invention described in (2-5), the writing pitch used to record the image of the image data is determined from a plurality of writing pitches, based on the supplementary information and the image data to be recorded is interpolated by the writing pitch. This configuration ensures the image to be recorded, wherein the deterioration of image quality is minimized by the preferable writing pitch conforming to the supplementary information, selected from a plurality of writing pitches.

According to the invention described in (2-6), a variable writing pitch mode or a fixed writing pitch mode is set, thereby determining the writing pitch to be used to record the image of the image in a flexible manner, depending on conformance or non-conformance to the supplementary information.

According to the invention described in (2-7), the supplementary information includes at least one of radiographing condition information, information on the usage of image data, reading pitch information of the image generating apparatus, and information on interpolation magnification factor of image data. This allows a preferable writing pitch to be determined, conforming to at least one of radiographing condition, usage of image data, reading pitch and interpolation magnification factor.

According to the invention described in (2-8), there are at least three writing pitches. This arrangement provides interpolation of image data corresponding to a wide range of reading pitches, wherein deterioration of image quality is minimized by a preferable writing pitch.

According to the invention described in (2-9), the writing pitch used to record the image of the image data, together with the image data, is recorded on the recording medium. This permits the recorded reading pitch to be checked by an observer of the image recorded on the recording medium.

According to the invention described in (2-10), the image data is recorded on the recording medium by the photothermal silver halide method. This arrangement provides recording of a medical image suitable for diagnosis.

(3-1) A medical image recording system for recording the medical image of a radiographed subject on a recording medium, the aforementioned medical image recording system comprising:

a plurality of trays for loading a recording medium;

a tray selecting section for selecting a tray as an output destination from a plurality of the aforementioned trays;

an image recording section for recording a medical image on a recording medium by switching between at least two writing pitches; and a control section for setting the writing pitch for each of the aforementioned trays and switching the writing pitch of the aforementioned image recording section conforming to the selected tray, thereby recording the medical image.

(3-2) The medical image recording system described in (3-1) wherein the control section has a table for storing the writing pitch to be set conforming to the tray serving as an output destination.

(3-3) The medical image recording system described in (3-1) wherein the control section selects either the mode where the writing pitch conforming to the selected tray is set and switching is performed between writing pitches of the image recording section, or the mode where one writing pitch is set for all trays, without switching performed between writing pitches of the image recording section; and allows the image recording section to record the medical image in conformity to the set mode.

(3-4) The medical image recording system described in (3-1) wherein the control section switches between at least three writing pitches, and allows the image recording section to record the medical image.

(3-5) The medical image recording system described in (3-1) wherein the image recording section records the writing pitch on a recording medium when recording a medical image on the recording medium.

(3-6) The medical image recording system described in (3-1) wherein the image recording section records a medical image on a recording medium according to the photothermal silver halide method.

(3-7) A medical image recording system for recording the medical image of a radiographed subject on a recording medium, the aforementioned medical image recording system comprising:

an image recording section for recording a medical image on a recording medium by switching between at least two writing pitches;

a control section for allowing the image recording section to record the medical image by setting the writing pitch for each size of the recording medium for recording and switching the writing pitch of the image recording section.

(3-8) The medical image recording system described in (3-7), wherein the control section contains a table for storing the reading pitches to be set according to the size of the recording medium.

(3-9) The medical image recording system described in (3-7), wherein the control section selects either the mode where the writing pitch is set in response to the size of the recording medium and switching is performed between writing pitches of the image recording section, or the mode where one writing pitch is set for all recording mediums, without switching performed between the writing pitches of the image recording section; and allows the image recording section to record the medical image in conformity to the set mode.

(3-10) The medical image recording system described in (3-7), wherein the control section switches between at least three writing pitches, and allows the image recording section to record the medical image.

(3-11) The medical image recording system described in (3-7), wherein the image recording section records the writing pitch on a recording medium when recording a medical image on the recording medium.

(3-12) The medical image recording system described in (3-7), wherein the image recording section records a medical image on a recording medium according to the photothermal silver halide method.

According to the invention described in (3-1), an image recording apparatus containing a plurality of trays for loading a recording medium switches the writing pitch of the image recording section in conformity to the writing pitch set for each tray and records a medical image on a recording medium. When recording mediums of a different property are loaded on each tray, this arrangement ensures medical image to be recorded at a preferable writing pitch in conformity to the recording medium.

According to the invention described in (3-2), the relationship between the tray serving as an output destination and the writing pitch can be changed as desired, by changing the tray serving as an output destination, stored in a table, and the writing pitch. This configuration provides a highly versatile image recording apparatus conforming to the particular requirements of a user.

According to the invention described in (3-3), it is possible to select between the mode where switching is performed between writing pitches for each selected tray, and the mode where the identical writing pitch is set for all trays, and to allow the image recording section to record a medical image. This configuration makes it possible to select between improvement of the quality of the medical image in response to the particular requirements and improvement of processing efficiency.

According to the invention described in (3-4), when a greater number of writing pitches are set, it is possible to ensure more accurate reproduction of the medical image scanned according to various sizes of the reading pixels, for example.

According to the invention described in (3-5), when a medical image as well as a writing pitch is recorded on a recording medium, a technical expert can find out an error quickly, for example, if the medical image has been recorded at a writing pitch different from the set writing pitch. This arrangement also allows a doctor diagnosing the medical image to refer to the writing pitch to diagnose the medical image.

According to the invention described in (3-6), a medical image can be recorded on a recording medium without wet processing.

According to the invention described in (3-7), the writing pitch of the image recording section can be selected in response to the writing pitch to be set for each size of the recording medium, and the medical image can be recorded on the recording medium. Accordingly, for example, when a medical image different in property for each size of the recording medium is recorded, the medical image can be recorded by the preferable writing pitch in conformity to the quality of the medical image.

According to the invention described in (3-8), the relationship between the recording medium and writing pitch can be freely modified by changing the size of the recording medium stored in the table and the writing pitch. This configuration provides a highly versatile image recording apparatus conforming to the particular requirements of a user.

According to the invention described in (3-9), it is possible to select between the mode where switching is performed between the writing pitches for each size of the recording medium and the mode where the identical writing pitch is set for all the recording mediums, and to allow the image recording section to record a medical image. This configuration makes it possible to select between improvement of the quality of the medical image in response to the particular requirements and improvement of processing efficiency.

According to the invention described in (3-10), when a greater number of writing pitches are set, it is possible to ensure more accurate reproduction of the medical image scanned according to various sizes of the reading pixels, for example.

According to the invention described in (3-11), when a medical image as well as a writing pitch are recorded on a recording medium, a technical expert can find out an error quickly, for example, if the medical image has been recorded at a writing pitch different from the set writing pitch. This arrangement also allows a doctor diagnosing the medical image to refer to the writing pitch to diagnose the medical image.

According to the invention described in (3-12), a medical image can be recorded on a recording medium without wet processing.

Referring to the drawing, the following describes the first, second and third embodiments in that order, without the scope of the invention being restricted to the illustrated examples.

Embodiment 1

Figure 2:
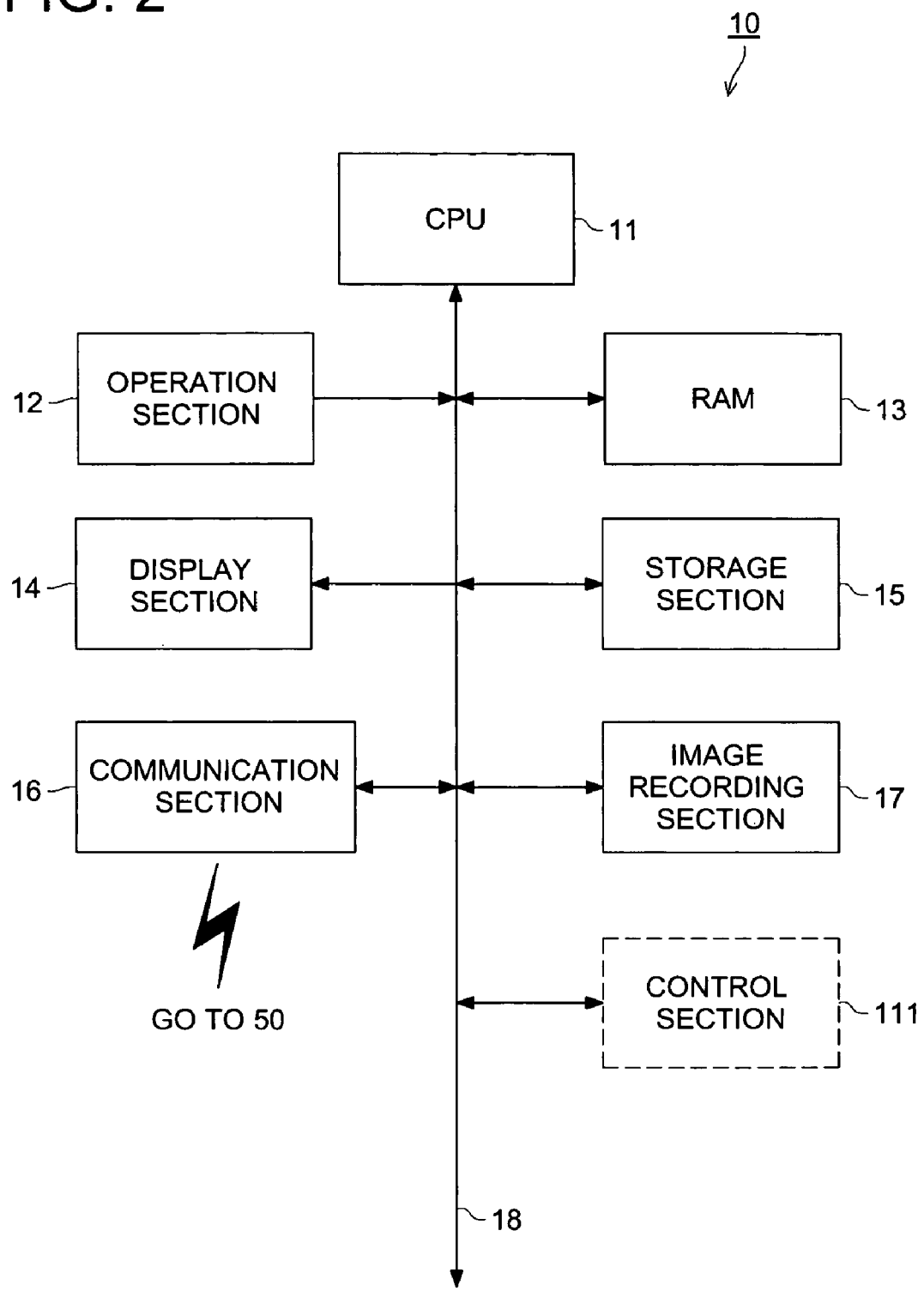
FIG. 2 is a block diagram representing the interior of an image recording apparatus 10.
Figure 3:
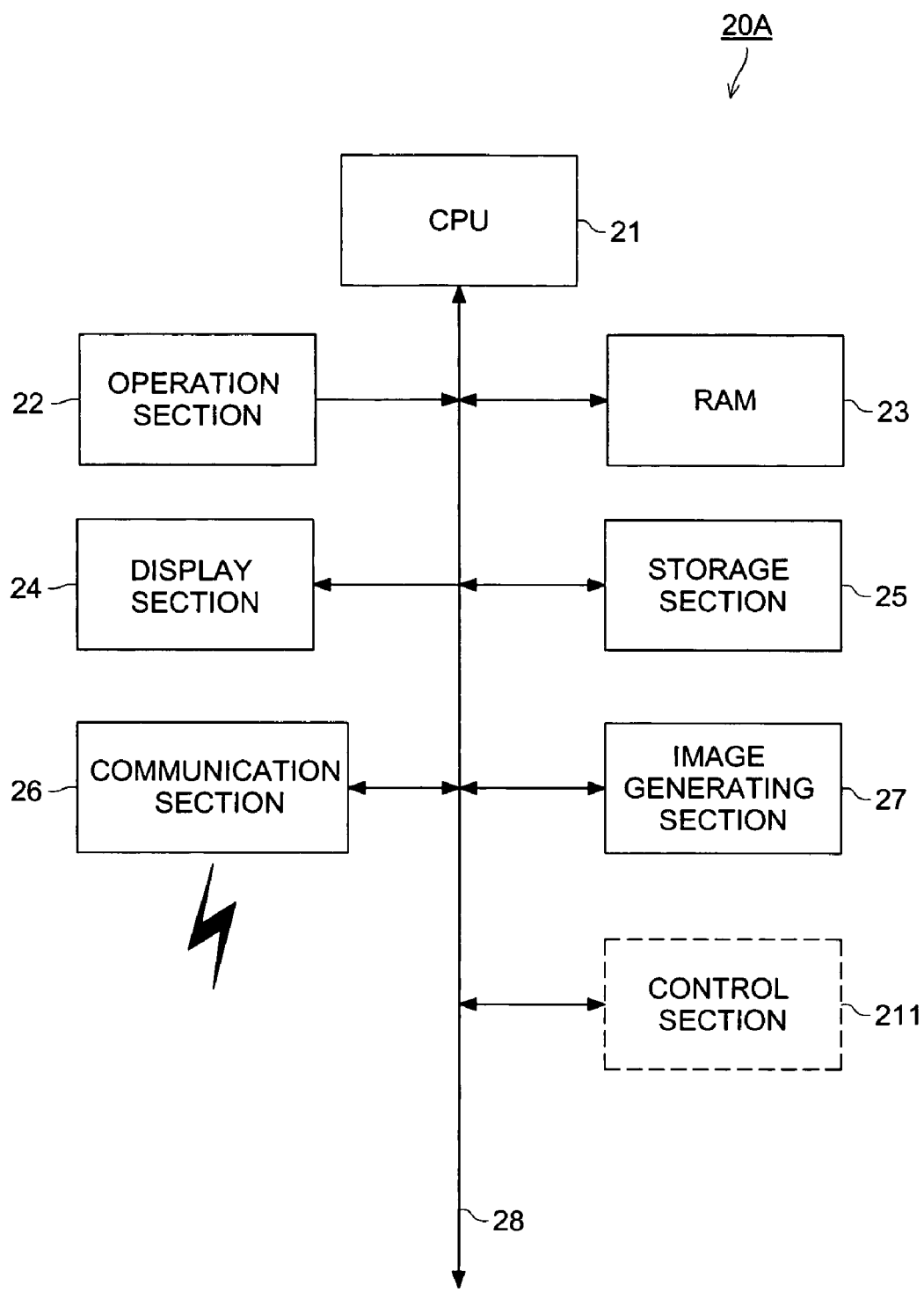
FIG. 3 is a block diagram representing the interior of an image generating apparatus 20A.

In the first place, the first embodiment of the present invention will be described with reference to FIGS. 1 through 15. FIG. 1 shows the block diagram of the medical image recording system 100 of the present invention. FIG. 3 is a block diagram representing the interior of an image generating apparatus (image forming apparatus) 20A.

The medical image recording system 100 given in FIG. 1 is a system, installed, for example, in a hospital or a medical institution, for recording the image data of the radiographed lesion of a patient, on a recording medium. As shown in FIG. 1, the medical image recording system 100 of the present invention consists of an image recording apparatus 10, image generating apparatuses 20A, 20B and 20C, a CR network 30A, and an RIS (Radiography Information System)/HIS (Hospital Information System) 40, and a DICOM conversion section 50. The image recording apparatus 10, image generating apparatuses 20A, 20B and 20C, RIS/HIS 40 and DICOM conversion section 50 are connected to a network bus 60 for communication.

The image generating apparatus 20A is an image generating apparatus for computed tomography, compatible with the DICOM (Digital Imaging and Communication in Medicine). The image generating apparatus 20A obtains the image data of the lesion of a patent CT scanning and reads it at the size of the reading pixel (reading pitch) of 87.5 microns. Supplementary information is added to this image data, and the image data in a DICOM-compatible data format is set to the image recording apparatus 10. In this embodiment, the supplementary information contains at least of the information on writing pitch and information on image generating apparatus.

The image generating apparatus 20B is an image generating apparatus for performing for MRI (Magnetic Resonance Imaging), not compatible with the DICOM. The image generating apparatus 20B obtains the image data of a patient's lesion by MRI scanning, and reads it according to the reading pitch of 87.5 microns.

The DICOM conversion section 50 adds supplementary information such as patient ID information and radiographic condition information to the image data inputted by the image generating apparatus 20B, and sends it to the other equipment connected to the communication network after converting it into a DICOM-compatible data format.

The image generating apparatus 20C is an image generating apparatus for exclusive use in mammography. The image generating apparatus 20C obtains the image data of the patient's breast and reads it at a reading pitch of 50 microns. It adds supplementary information to this image data and sends the image data in a DICOM-compatible data format to the image recording apparatus 10.

A mammographic image is given in the form of film output of high density and high definition, according to the characteristics of the lesion such as calcification of extremely small quantities and the method of observation (image reading method).

The CR network 30A consists of:
an image reading apparatus 20D, 20H
at least one WS (workstation) 33 capable of identifying the image of the radiographed patient by getting radiographic/inspection order information from the RIS/HIS 40, and associating the inspection order information, used cassette ID, radiographic conditions and image processing conditions; and
a JOB manager 31 for determining the WS as a distribution destination of the image read by the image reading apparatus 20D, 20H, and distributing the control conditions of the image reading apparatus 20D, 20H.

The image reading apparatus 20D is an image reading apparatus for CR scanning at the standing position. The image reading apparatus 20D reads the image data of the lesion of a patient at the standing position at a reading pitch of 87.5 microns, and send it to the WS 33. After having been displayed and verified on the WS 33, the supplementary information is added to the image data by the WS 33. Then the image data in a DICOM-compatible data format is sent to the image recording apparatus 10.

The image recording apparatus 20H employs a CR cassette. A cassette is carried into a hospital or the like by an engineer, based on the radiographic/inspection order information from the RIS/HIS 40 or others, and the patient's lesion is subjected to CR scanning. After that, the CR-scanned cassette is carried to the image reading apparatus 20H, and is set in position. The image reading apparatus 20H reads the image data from the image of the set cassette at a reading pitch of 50 microns for mammographic image or at a reading pitch of 87.5 microns for general image, and sends the read image data to the WS 33. After having been displayed and verified on the WS 33, the supplementary information is added to the image data by the WS 33. Then the image data in a DICOM-compatible data format is sent to the image recording apparatus 10.

As described above, the functions as an image generating apparatus for generating the image data are performed by the combination of the image reading apparatuses 20D and 20H and WS 33.

When the cassette containing the image gained by radiographing a patient is inserted into the image reading apparatus 20H, the barcode information to be formed into an ID of the cassette is read out. The image reading apparatus 20H gains the information on the radiographed site corresponding to the cassette ID and/or the reading pitch information contained in the image processing conditions, and switches the reading pitch to read the image data.

The image recording apparatus 10 receives the image data from the image generating apparatus containing the image reading apparatus 20D, and records it on a recording medium. As shown in FIG. 2, the image recording apparatus 10 includes a CPU 11 for providing control of various portions, an operation section 12 for receiving operation inputs, a RAM 13 for storing the data temporarily, a display section 14 for displaying data, a storage section 15 for storing data, a communication section 16 for communication with an external device, and an image recording section 17 for recording image data on a recording medium. These components are each connected by a bus 18.

The CPU 11 reads the program specified from various programs stored in the storage section 15 and expands it in the work area of the RAM 13, thereby providing various controls through collaboration with the program on the RAM 13. The control section 111 provides functions of a setting section, determining section and mode setting section.

The operation section 12 has numeric keys and functions keys. When these keys are depressed, the operation section 12 outputs the depression signals. The operation section 12 may be composed of a touch panel integrally built with the display section 14. The display section 14 is composed of an LCD (liquid crystal display) and displays an image according to the display signal from the CPU 11.

The RAM 13 contains a program area for expanding a program, and a data area for temporary storage of the data inputted from the operation section 12 or the result of processing by the CPU 11. The RAM 13 is composed of the semiconductor capable of reading and writing. The storage section 15 consists of a ROM, FROM, HDD (Hard Disk Driver), and stores the programs, data of various types and image data. In the present embodiment of the present invention, the storage section 15 stores the first image recording program and writing pitch setting program.

The communication section 16 is connected with the network bus 60 and is composed of a network card for communication with external devices on the communication network. The communication network is connected with the RIS/HIS 40, but can be connected with the LAN (Local Area Network), WAN (Wide Area Network) and others.

In the image recording section 17, the image data received from the image generating apparatuses 20A, 20B and 20C and image reading apparatuses 20D and 20H through the communication section 16 is recorded on a recording medium according to the photothermal silver halide method at a writing pitch of 25 or 43.75 microns. The mammographic image required to provide high definition is recorded is at a writing pitch of 25 microns, while the general radiographic image is recorded at a writing pitch of 43.75 microns.

The image recording section 17 may be provided with a plurality of trays for separately recording mediums of multiple types (size and range of density that can be recorded), and recording may be carried out by changing the tray of the destination of recording in conformity to the writing pitch used for recording.

With reference to FIG. 3, the internal configuration of the image generating apparatus 20A will be described. The internal configuration of the image generating apparatuses 20B and 20C is the same as that of the image generating apparatus 20A, which will be taken as a representative for explanation.

As shown in FIG. 3, the image generating apparatus 20A contains a CPU 21, operation section 22, RAM 23, display unit 24, storage section 25, communication section 26, image generating section 27 and bus 28. A control section 211 is formed by the collaboration of the CPU 21 with the program expanded on the RAM 23. The CPU 21, operation section 22, RAM 23, display unit 24, storage section 25, communication section 26, control section 211 and bus 28 of the image generating apparatus 20A are the same as the CPU 11, operation section 12, RAM 13, display section 14, storage section 15, communication section 16, control section 111 and bus 18 of the image recording apparatus 10, respectively. To avoid duplication, the following mainly describes the differences:

The storage section 25 stores a first image generating program. The image generating section 27 scans the patient's lesion and the like according to the CT scanning method, and reads the radiographic image at a predetermined reading pitch of (87.5 microns). The image generating sections 27 of the image generating apparatuses 20B and 20C are different in the radiographing method and reading pitch, as described above. Further, the image reading apparatus 20D reads the image data obtained by CR scanning, instead of the image generating section 27, at a predetermined reading pitch, and other portions are formed in the same configuration.

The following describes the optimum writing pitch to be set in response to the reading pitch. Firstly, the relationship of interpolation magnification factor in conformity to the combination between reading pitch and writing pitch will be described with reference to FIG. 4. FIG. 4 shows the relationship of interpolation magnification factor in conformity to the combination between reading pitch and writing pitch.

As described above, the reading pitch in conformity to the type of the image generating apparatus is available in two types; 87.5 microns (CT, MRI, stereoscopic CR) and 50 microns (mammographic apparatus). The writing pitch is also available in two types; 43.75 microns and 25 microns. When the reading pitch is 87.5 microns and the writing pitch is 43.75 microns, interpolation magnification factor is 2.0 times. When the reading pitch is 50 microns and the writing pitch is 43.75 microns, interpolation magnification factor is 1.1 times. When the reading pitch is 87.5 microns and the writing pitch is 25 microns, interpolation magnification factor is 3.5 times. When the reading pitch is 50 microns and the writing pitch is 25 microns, interpolation magnification factor is 2.0 times.

When the interpolation magnification factor is an integral multiple, the deterioration of the data in the image signals before and after interpolation can be minimized. When the interpolation magnification factor is not an integral multiple, the deterioration of the information can be reduced more effectively as interpolation magnification factor is higher. If magnification factor is 1.8 times or more, the deterioration can be reduced in getting the medical image. Thus, as shown in FIG. 4, the most preferable relationship between the reading pitch and writing pitch can be obtained where the interpolation magnification factor is 2.0 times. The second most preferable relationship can be obtained where the interpolation magnification factor is 1.1 times. The relationship with the interpolation magnification factor of 1.1 times signifies the great deterioration of data. Thus, for the medical image having a reading pitch of 87.5 microns, the preferred processing of interpolation can be provided by using the writing pitch of 43.75 microns. For the medical image having a reading pitch of 50 microns, the preferred processing of interpolation can be provided by using the writing pitch of 25 microns.

In the apparatus such as the CT, MR1 and CR where the reading pitch is 87.5 microns, image formation is possible at a pitch of 25 microns. However, the processing capacity is reduced since image processing requires much time. The mammography at a reading pitch of 50 microns requires high definition in diagnosis. Accordingly, a finer writing pitch is necessary.

Figure 5A:
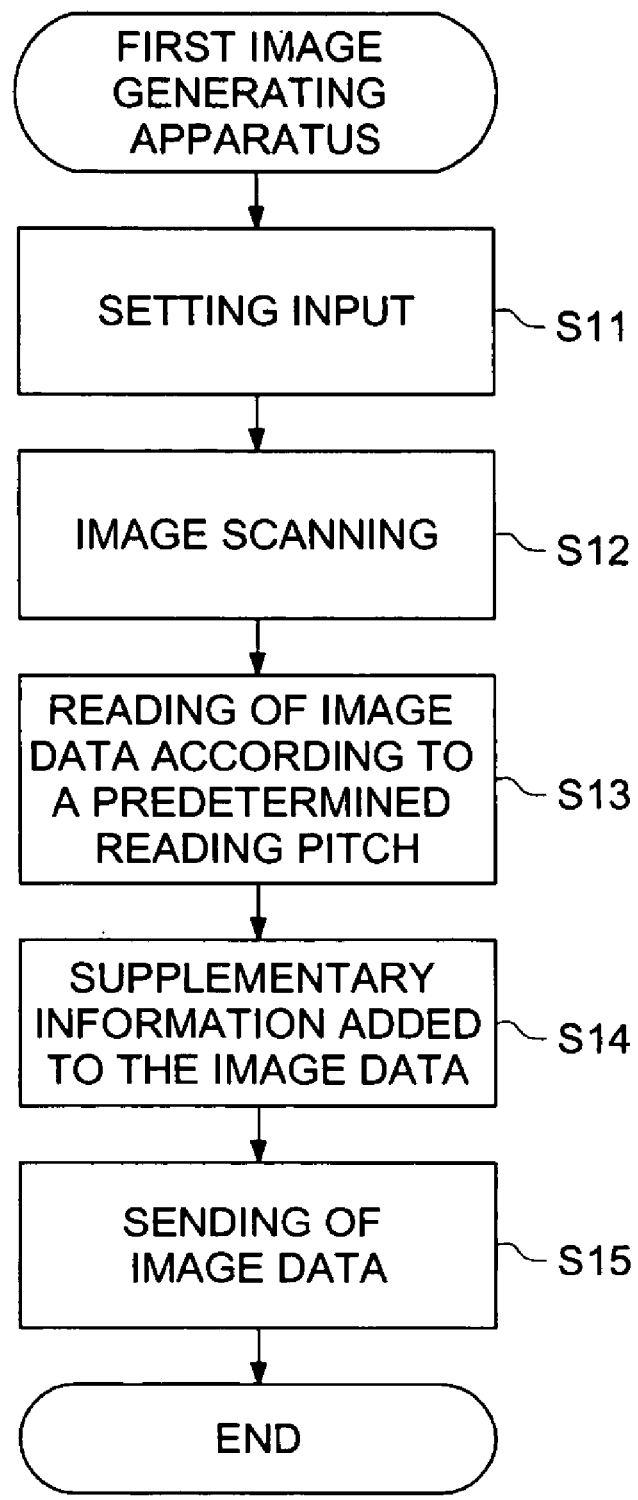
FIGS. 5(a) and 5(b) are a flowchart showing the first processing of image generation applied by the image generating apparatus 20A.
Figure 5:
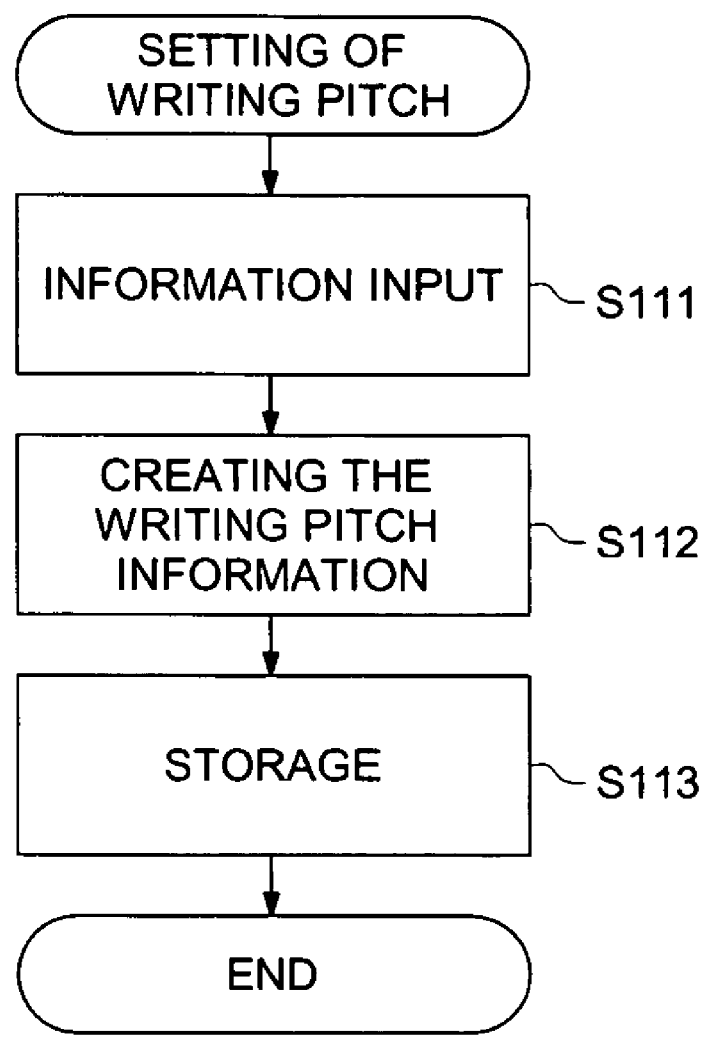

With reference to FIGS. 5($a$), 5($b$), 6($a$) and 6($b$), the following describes the operation of the medical image recording system 100:

With reference to FIG. 5($a$), the following describes the processing of first image generation where the image of the patient's lesion is radiographed in the image generating apparatus 20A and an image data is generated.

Immediately when the instruction of starting the processing of first image generation has been inputted from the operation section 22 by an operator in the image generating apparatus 20A, the CPU 21 reads the first image generating program stored in the storage section 25 and expands it in the RAM 23. The processing of first image generation is executed by the collaboration between the first image generating program expanded in the RAM 23 and the CPU 21. The following description assumes that the subject of processing in each step refers to the control section 211 unless otherwise specified.

As shown in FIG. 5(a), the control section 211 receives information on various settings for radiographing the patient's lesion inputted by an operator through the operation section 22 (Step S11). It is also possible to arrange such a configuration that the image reading pitch is determined by each image generating apparatus in advance and is not included in the information on various settings. It is also possible to arrange such a configuration that the image reading apparatus 20D, together with the information on various settings to be inputted, is received from the RIS/HIS 40 through the bus 32 and communication section 26 and the radiographic/inspection order information is added to the information on various settings.

Based on the information on various settings inputted in Step S11, the patient's lesion is radiographed by the image generating section 27 (Step S11). The image data is read from the image signal radiographed in Step S12 at a predetermined reading pitch (87.5 microns image generating apparatuses 20A and 20B, and 50 microns in the case of image generating apparatus 20C) (Step S13).

Supplementary information is added to the image data read (In Step S13 Step S14). Supplementary information contains the information on the writing pitch used to record the image of the image date in the image recording apparatus 10. For example, it includes the radiographic condition information on the radiographing condition such as the radiographed site of a subject, information on the use of image data or information on the reading pitch of the image generating apparatus having generated the image data. Further, when the writing pitch for recording the mammographic image is separated from that of the general radiographic image in an arrangement where a plurality of writing pitches can be set for one type of image generating apparatus, it is sufficient if the information as to whether the radiographic image is a mammographic image or not can be obtained. The supplementary information is the information as to whether the radiographed site is a breast or not, information as to whether the use is to record a mammographic image and information as to whether the reading pitch of the image generating apparatus is compatible with mammography, for example.

Then the image data including the supplementary information is sent to the image recording apparatus 10 through the network bus 60 (Step S15), and processing of the first image generation terminates. In the image generating apparatuses 20B and 20C and image reading apparatus 20D, processing of the first image generation is carried out. In the case of the image generating apparatus 20B, Step S14 is implemented by the DICOM conversion section 50. The image data containing the supplementary information is subjected to DICOM conversion. In the image reading apparatus 20D, the image is captured by the CR scanner in Step S12.

With reference to FIG. 5(b), the following describes the processing of setting the writing pitch where the writing pitch corresponding to the type of image generating apparatus is set. In the image generating apparatuses 20A, 20B and 20C and image reading apparatus 20D, the image data is read according to the reading pitch unique to each. For the sake of brevity, it is assumed that only the image data of the mammographic cassette is inputted in the image reading apparatus 20H for the present embodiment, and the image data is read at the reading pitch of the mammographic image. The optimum writing pitch to each reading pitch is selected from a plurality of writing pitches that can be recorded by the image recording apparatus 10 and is set.

Immediately when the instruction of starting the processing of writing pitch setting has been inputted from the operation section 12 by an operator in the image recording apparatus 10, the CPU 11 reads the pitch setting program stored in the storage section 15 and expands it in the RAM 13. The processing of pitch setting is executed by the collaboration between the writing pitch setting program expanded in the RAM 13 and the CPU 11. The following description assumes that the subject of processing in each step refers to the control section 111 unless otherwise specified.

As shown in FIG. 5(b), the control section 111 receives the type of each image generating apparatus inputted by the operator through the operation section 12 and the writing pitch associated thereto (Step S111). In the present embodiment, the writing pitch of 43.75 microns for recording the general radiographic image is associated with the image generating apparatuses 20A and 20B and image reading apparatus 20D where the reading pitch for general radiographic image is 87.5 microns. The writing pitch of 25 microns for recording the mammographic image is associated with the image generating apparatus 20C and image reading apparatus 20H where the reading pitch for mammographic image is 50 microns.

This association depends on whether the usage of image recoding and radiographic conditions conform to mammography (mammographic image) or not.

It is also possible to arrange such a configuration as to establish an association to produce a preferable combination between the image generating apparatus and writing pitch so that deterioration of image quality during image recording will be reduced, based on the reading pitch of the image generating apparatus, the writing pitch of the image generating apparatus and the interpolation magnification factor from the image to be inputted, to the image to be recorded.

The type of the image generating apparatus inputted in Step S111 and the writing pitch associated therewith are formed into writing pitch information (Step S112). The writing pitch created is stored in the storage section 15 (Step S113), and the processing of writing pitch setting terminates.

Figure 6A:
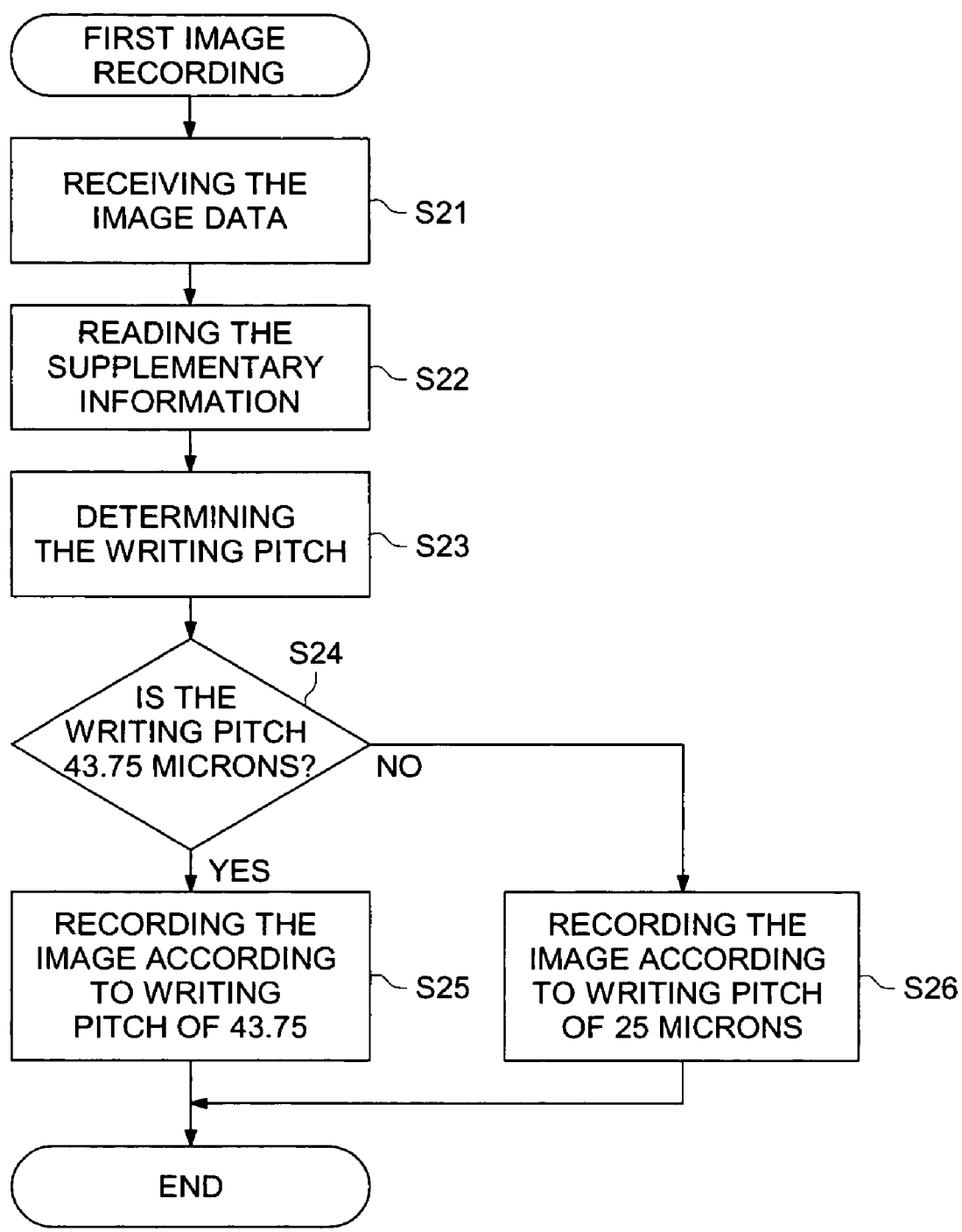
FIGS. 6(a) and 6(b) are a flowchart showing the first processing of image generation applied by the image recording apparatus 10.

Referring to FIG. 6(a), the following describes the processing of first image recording where the image data inputted by the image generating apparatus including the image reading apparatus is recorded on the recording medium, in the image recording apparatus 10. Immediately when the instruction of starting the processing of first image recording has been inputted from the operation section 12 by an operator in the image recording apparatus 10, the CPU 11 reads the first image recording program stored in the storage section 15 and expands it in the RAM. The processing of first image recording is executed by the collaboration between the first image recording program expanded in the RAM 23 and the CPU 11. The following description assumes that the subject of processing in each step refers to the control section 211 unless otherwise specified. The following description assumes that the subject of processing in each step refers to the control section 111 unless otherwise specified.

It is assumed that the processing of first image generation has already been executed in the image generating apparatus. The image data containing the supplementary information is transmitted to the image recording apparatus 10 through the network bus 60.

The control section 111 receives the image data from the image generating apparatus where the image data is inputted, through the network bus 60 and communication section 16 (Step S21). The supplementary information of the image data received in Step S21 is read and acquired (Step S22).

A preferable writing pitch is determined in conformity to the supplementary information (Step S23). For example, when the supplementary information contains the information on the radiographed site of a patient, a writing pitch of 43.75 microns for general radiographic image or a writing pitch of 25 microns for mammographic image is determined, depending on if the site is a breast or not. When the supplementary information contains the information on the usage of the image data, a writing pitch of 43.75 microns for general radiographic image or a writing pitch of 25 microns for mammographic image is determine, depending on if the usage is for mammographic image. When the supplementary information contains the information on reading pitch, a writing pitch of 43.75 microns for general radiographic image or a writing pitch of 25 microns for mammographic image is determined, depending on if the reading pitch has a size (87.5 microns) for general radiographic image or not.

Evaluation is made to see if the writing pitch determined in Step S23 is 43.75 microns or not (Step S24). If the writing pitch is 43.75 microns or not (Step S24; YES), the image data received in Step S21 is interpolated at a writing pitch of 43.75 microns by the image recording section 17. At the same time, the value for the writing pitch (43.75 microns) is recorded on the recording medium (Step S25), and processing of the first image recording terminates.

If the writing pitch is not 43.75 microns, (Step S24; NO), the writing pitch is 25 microns. The image data received in Step S21 is interpolated at a writing pitch of 25 microns by the image recording section 17 and is recorded on a recording medium. At the same time, the value for the writing pitch (25 microns) is recorded on the recording medium (Step S26), and the processing of first image recording terminates.

Referring to FIG. 6(b), the following describes the processing of first image recording where the image data inputted by the image generating apparatus is recorded on the recording medium, in the image recording apparatus 10. Immediately when the instruction of starting the processing of first image recording has been inputted from the operation section 12 by an operator in the image recording apparatus 10, the CPU 11 reads the first image recording program stored in the storage section 15 and expands it in the RAM 23. The processing of first image recording is executed by the collaboration between the first image recording program expanded in the RAM 23 and the CPU 11.

In the image generating apparatuses 20A, 20B (and DICOM conversion section 50) and 20C and image reading apparatus 20D or 20H, the patient's lesion is radiographed and the data is read by the image generating apparatus at the unique reading pitch. Supplementary information is added to the image data and the image data including the supplementary information is sent to the image recording apparatus 10 through the network bus 60.

The supplementary information added to the radiographed image data contains the information on the type of the image generating apparatus having produced the image data to be recorded, and the information on the writing pitch to be used to record the image of the image data. For example, such information can include radiographic condition information on the radiographic condition of the site of a subject to be radiographed, information on the usage of image data, information on reading pitch of the image generating apparatus having generated the image data, and information on interpolation magnification factor from image reading to image recording. When the writing pitch for recording the mammographic image is separated from that of the general radiographic image in an arrangement where a plurality of writing pitches can be set for one type of image generating apparatus, it is sufficient if the information as to whether the radiographic image is a mammographic image or not can be obtained. The supplementary information may be the information as to whether the radiographed site is a breast or not, information as to whether the use is to record a mammographic image and information as to whether the reading pitch of the image generating apparatus or interpolation magnification factor is compatible with mammography or not, for example. The following describes the case when the information on the type of the image generating apparatus is included in the supplementary information:

The image data is received from the image generating apparatus where the image data has been inputted, through the network bus 60 and communication section 16 (Step S121). The information on the setting of the variable writing pitch mode or the fixed writing pitch mode inputted by an operator through the operation section 12 is received (Step S122). The variable writing pitch mode or the fixed writing pitch mode is set based on this information on setting (Step S122). The variable writing pitch mode is a mode where the writing pitch is varied in response to the type of the image generating apparatus, whereas the fixed writing pitch mode is the mode where the writing pitch is fixed, independently of the type of the image generating apparatus. For example, a flag showing either mode is stored in the storage section 15, and the mode is set by turning on or off this flag. In the fixed writing pitch mode according to the present embodiment, the writing pitch is uniformly set at a high-definition level of 25 microns, without being restricted thereto. To reduce the load of image processing, writing pitch may be set to the level of 43.75 microns.

Evaluation is made to see whether the mode set in Step S122 is the variable writing pitch mode or not (Step S123). If it is the variable writing pitch mode (Step S123; YES), the writing pitch information stored in the storage section 15 is read and acquired. Then supplementary information of the image data received in Step S121 is read out and the information on the type of the image generating apparatus contained in the supplementary information is acquired (Step S124).

Based on the writing pitch, the writing pitch corresponding to the type of the image generating apparatus in the supplementary information is determined (Step S125). Then evaluation is made to see whether the writing pitch determined in Step S125 is 43.75 microns or not (Step S126). When the writing pitch is 43.75 microns (Step S126; YES), the image data received in the Step S121 is interpolated at a writing pitch of 43.75 microns by the image recording section 17, and is recorded on a recording medium. At the same time, the value of the writing pitch (43.75 microns) is recorded (Step S127), and processing of first image recording terminates.

When the writing pitch is not 43.75 microns (Step S126; NO), the writing pitch is 25 microns. The image data received in Step S121 is interpolated at a writing pitch of 25 microns by the image recording section 17, and is recorded on a recording medium. At the same time, the value of the writing pitch (25 microns) is recorded on the recording medium (Step 128) and processing of first image recording terminates. If the mode is not a variable writing pitch mode (Step S123; NO), it is the fixed writing pitch mode, and the system goes to Step S128.

As described above, according to the present embodiment, the writing pitch used to record the image of the image data is determined in the image recording apparatus 10, based on the supplementary information of the image data received from multiple image generating apparatuses containing the image reading apparatus, and the image data is interpolated at this writing pitch; then the image data is recorded on a recording medium. This arrangement allows the image data to be recorded, wherein the deterioration of the quality of the image data generated by a plurality of image generating apparatuses is reduced by the preferable writing pitch in conformity to the supplementary information, selected from a plurality of writing pitches.

The writing pitch used to record the image of the image data is determined based on the writing pitch information and the information on the type of the image generating apparatus having generated the image data to be recorded, and the image data to be recorded is interpolated before it is recorded. This configuration ensures the image to be recorded, wherein the deterioration of image quality is reduced by the preferable writing pitch conforming to the type of the image generating apparatus, selected from a plurality of writing pitches.

When the writing pitch information is stored in the storage section 15, the load in creating and modifying the writing pitch information can be reduced. Further, the variable writing pitch mode and fixed writing pitch mode are set. This makes it possible to determine the writing pitch to be used to record the image of the image in a flexible manner, depending on conformance or non-conformance to the type of the image generating apparatus.

The image data as well as the writing pitch used to record the image of the image data are also recorded on a recording medium so that an observer of the image recorded on the recording medium can check the reading pitch. For example, an engineer can quickly find out the moving distance recorded according to an incorrect writing pitch. The doctor can use the medical image as a reference for his diagnosis.

The image data is recorded on the recording medium by the photothermal silver halide method. This arrangement provides recording of a medical image suitable for diagnosis.

The image generating apparatus including the image reading apparatus is connected with the image recording apparatus through the network. This permits a preferred and varied communication connection configuration to be formed.

The description below refers to the present embodiment, and is also applicable to the second and third embodiments to be described below:

Referring to FIGS. 7 through 15, the following describes an example of determining the preferable writing pitch, based on the interpolation magnification factor and reading pitch, and explains the method of determining the preferable writing pitch shown in Step S23.

The "image interpolation" refers to the processing of an image where re-sampling is performed based on the sample point. To put it more specifically, re-sampling is achieved by connecting the adjacent sample points using a smooth curve. What is called the sample point is defined as image signal array data. The image signal array data before and after image interpolation is assumed to be represented in the 2D tetragonal lattice design (where the interval between lattices is constant, as a matter of course).

When the sampling interval before image interpolation is $\Delta Xorg$ and the sampling interval after image interpolation is $\Delta Xproc$, interpolation magnification factor R can be defined as $R=\Delta Xorg/\Delta Xproc$. Enlargement interpolation is defined as $R>1$, reduction interpolation is as $R<1$, and life-size interpolation as $R=1$. The $\Delta Xorg$ corresponds to "reading pitch" of the image generating apparatus while the $\Delta Xproc$ corresponds to the "writing pitch" of the image recording apparatus.

The displacement (distance) between the coordinate corresponding to the data shown by the image signal before interpolation and the coordinate corresponding to the data shown by the image signal after interpolation gives influence to the quality of the recorded image. If this distance is small, the information kept by the original image signal can be maintained. If the distance is excessive, the information of the original image signal may be deteriorated.

Figure 7:
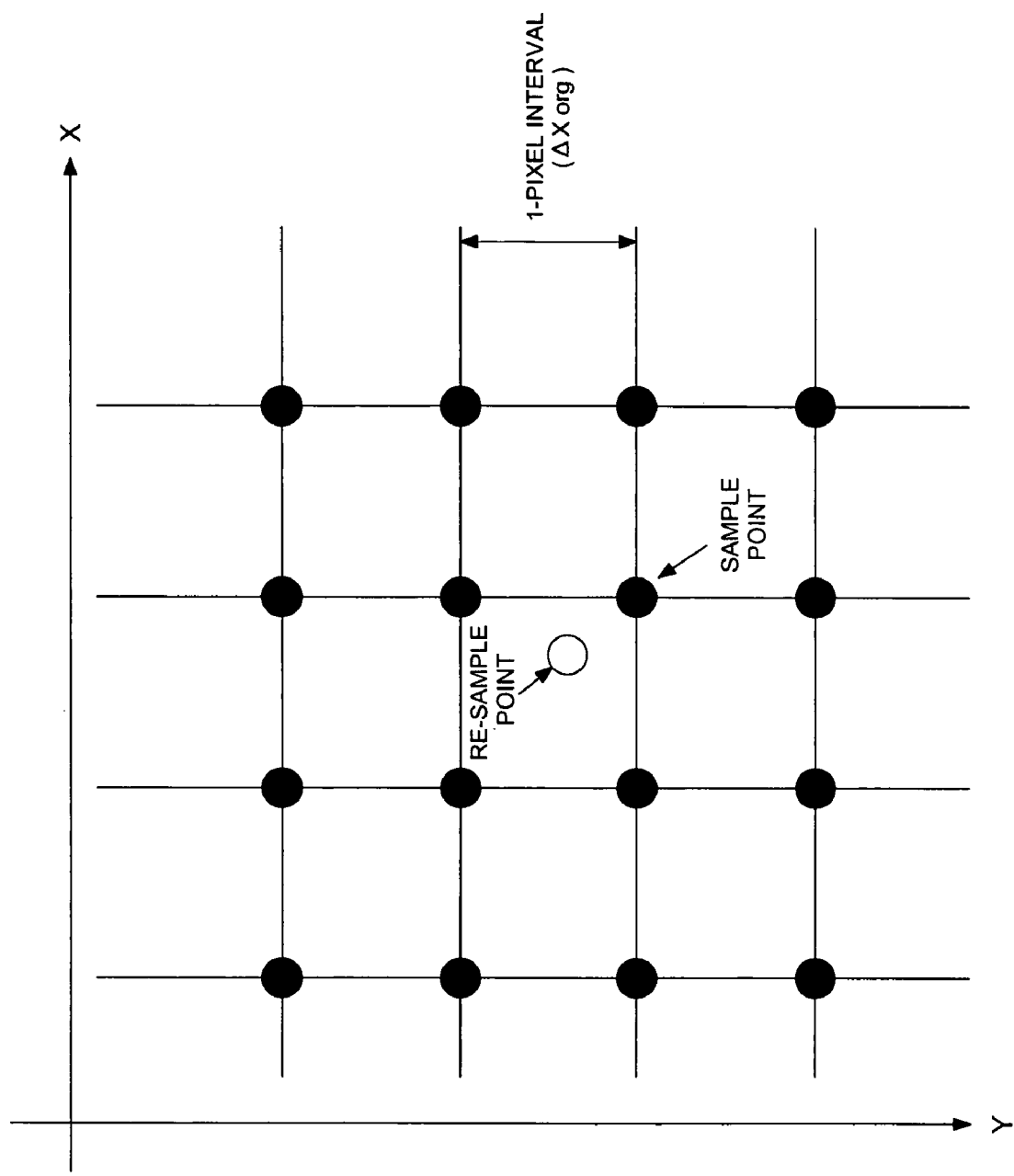
FIG. 7 is an explanatory diagram representing the processing of image interpolation related to a 2D image signal.

FIG. 7 is an explanatory diagram representing the processing of image interpolation related to a 2D image signal. The black circle indicates a sample point, representing the coordinate corresponding to each pixel data before image interpolation. The white circle indicates a coordinate corresponding to each pixel data after image interpolation. The interval between tetragonal lattices denote a sampling interval $\Delta Xorg$ before image interpolation. The pixel data of white circle can be calculated according to the productsum operation, using the pixel data of the adjacent "n×n". For example, when the "4×4" pixel data is used, calculation is made using the 16-point pixel data shown in FIG. 7. The details of the image interpolation are disclosed in the Official Gazette of Japanese Patent Tokkaihei 9-97330.

Figure 8:
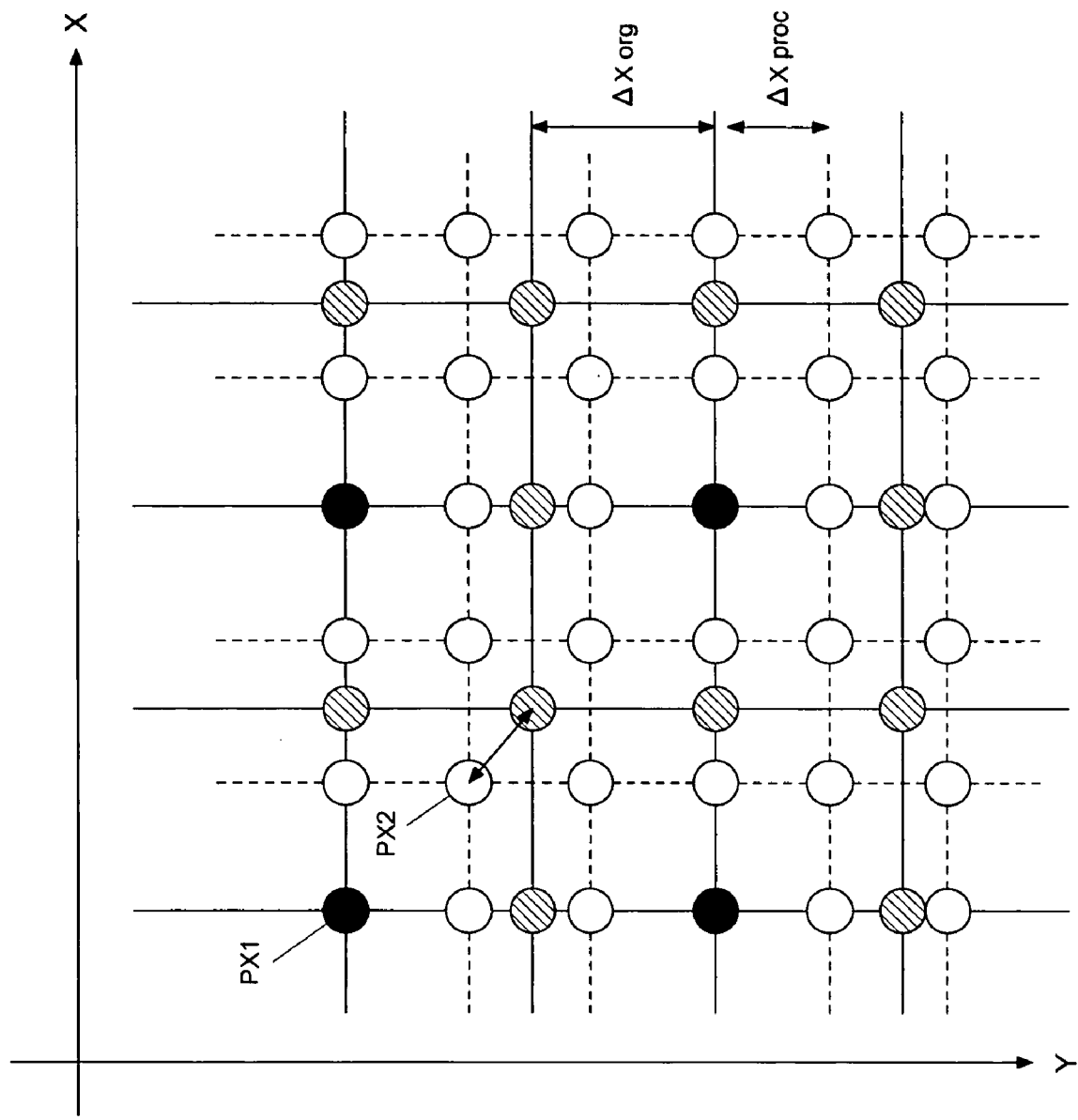
FIG. 8 is an explanatory diagram representing 1.5-times magnified interpolation.

FIG. 8 is an explanatory diagram representing 1.5-times magnified interpolation. A hatched circle indicates the coordinate of the pixel data before image interpolation, while a white circle indicates the coordinate of the pixel data after image interpolation and a black circle indicates the coordinates having reached agreement before and after image interpolation. The interval between the tetragonal lattice represented by a solid line is a sampling interval $\Delta Xorg$ before image interpolation, and the interval between the tetragonal lattice represented by a broken line is a sampling interval $\Delta Xorg$ after image interpolation.

FIG. 9 is a diagram showing an example of interpolation coefficient. A numeral in the lattice represents the interpolation coefficient of each pixel. FIG. 9(*a*) shows the interpolation coefficient in calculating the pixel data of the pixel PX1 shown in FIG. 8. Since there is agreement of the coordinates before and after image interpolation, the interpolation coefficient of the image data of the coordinate is "1". All the interpolation coefficients of other pixels are "0". FIG. 9(*b*) shows the interpolation coefficient for calculating the pixel data related to the pixel PX2 given in FIG. 8. The interpolation coefficient at the closest point is 0.63. Some of other interpolation coefficients may have a value other than "0".

The image interpolation is generally characterized in that the pixel data is changed by the distance between the re-sample point and the sample point closest to the sample point (hereinafter referred to as "closest distance"). As the closest distance is shorter, the interpolation coefficient at the sample point is closer to "1", and takes on a value close to the pixel data, on the one hand. On the other hand, as the closest distance is longer, the interpolation coefficient at the sample point is closer to "0", and is more likely to be affected by other pixel data. Thus, the image quality may depend on the closest distance. To put it another way, when the closest distance is shorter, the information of the original image signal can be maintained, if the closest distance is longer, the information of the original image signal can be deteriorated.

Figure 10:
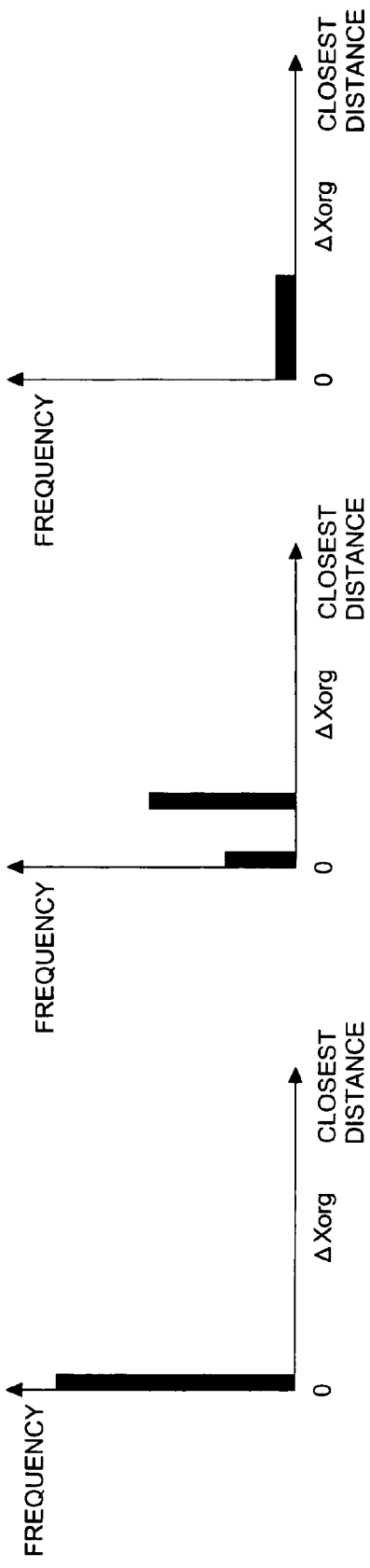
FIGS. 10(a), 10(b) and 10(c) are a diagram showing a histogram of the closest distance when the interpolation magnification factor has been changed, wherein (a) shows the histogram when the interpolation magnification factor is 1.0 times; (b) indicates the histogram when the interpolation magnification factor is 1.5 times; and (c) denotes the histogram when the interpolation magnification factor is 1.0001 times.

FIG. 10 is a diagram showing a histogram of the closest distance when the interpolation magnification factor has been changed. For simplicity, the following description will be given in terms of one dimension. FIG. 10(*a*) shows the histogram when the interpolation magnification factor is 1.0 times. FIG. 10(*b*) indicates the histogram when the interpolation magnification factor is 1.5 times. FIG. 10(*c*) denotes the histogram when the interpolation magnification factor is 1.0001 times. Generally, the cycle of the closest distance is represented by the numerator (integer) when the interpolation magnification factor is represented by an irreducible fraction.

If this fraction is smaller, the cycle will be shorter; whereas if this fraction is greater, the cycle will be longer.

In FIG. 10(a), the interpolation magnification factor is 1/1, and the closest distance is "0" at all times. In FIG. 10(b), the interpolation coefficient is 3/2, and the closest distance is "0" at a ratio of 1/3; then the closest distance becomes ΔXorg/3 at a rate of 2/3. Further, in FIG. 10(c), the interpolation magnification factor is 10001/10000, and the closest distance is present at approximately the same rate in the range from 0 through ΔXorg. To put it another way, this shows that the closest distance indicates an approximately random value.

Figure 11:
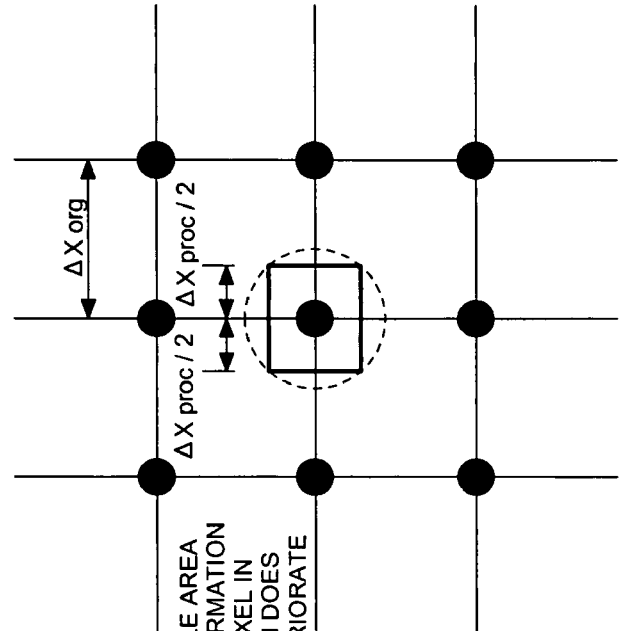
FIGS. 11(a) and 11(b) are a schematic drawing of the closest distance when the distribution of the closest distance is uniform, wherein (a) shows the case where the information of the pixel in question may deteriorate, while (b) the information of the pixel in question does not deteriorate.
Figure 11:
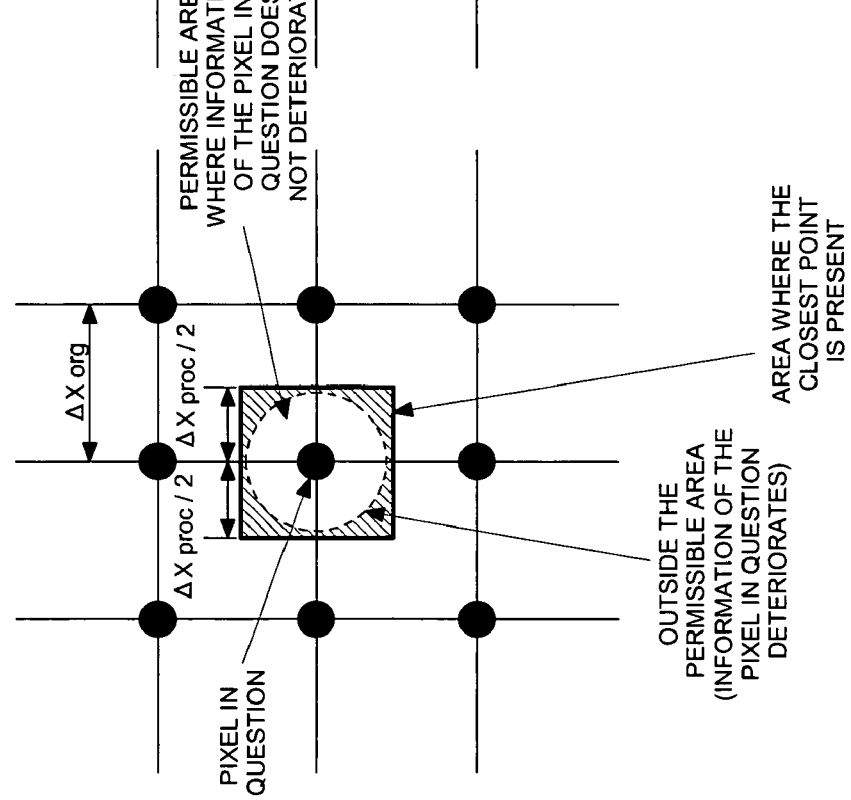

FIG. 11 is a schematic drawing of the closest distance when the distribution of the closest distance is uniform (for example, in FIG. 10(c)). FIG. 11(a) shows the case where the information of the pixel in question may deteriorate, while FIG. 11(b) shows the information of the pixel in question does not deteriorate.

As shown in FIG. 11, if the closest distance in all points is under dΔXorg, $$\Delta Xproc < 2^{1/2}\, d\Delta Xorg$$

$$\therefore R > (2^{1/2}\, d)$$

Further, if "d" is such that deterioration of image signal information prior to interpolation does not take place, d=0.40 empirically when the medical image is outputted. Thus, R>1.8 is preferred.

As described above, the prevent inventors have used a mathematical theory for the study. They made a separate functional evaluation test using an actually radiographed image to verify the adequacy of this consideration.

The prevent inventors took an X-ray radiograph of the human body (cranial bone was radiographed). Using an image generating apparatus, the data was outputted by an imager according photothermal silver halide method, based on the image signal in the form of digital data. FIG. 12 shows the result of functional evaluation made by the visual observation of three researchers engaged in the development of medical equipment. The evaluation was made in five grades: 5 (excellent), 4 (good), 3 (fair), 2 (poor) and 1 (very poor).

A score of 4 or more was given when the interpolation magnification factor was equal to or greater than 1.8 times or in the vicinity of 1.0 times in the functional evaluation. It has been proven that, from the theoretical viewpoint and from the viewpoint of function evaluation, R>1.8 provides preferable interpolation magnification factor in a medical image.

It has also been shown by visual observation that no direct influence was given to diagnosis. For a white patch or geometrical graphics of periodically arranged thin lines or the like, it is most preferable to use an integer as the interpolation magnification factor, and any deviation from an integer may deteriorate the image quality, according to the finding obtained in the evaluation.

Figure 13:
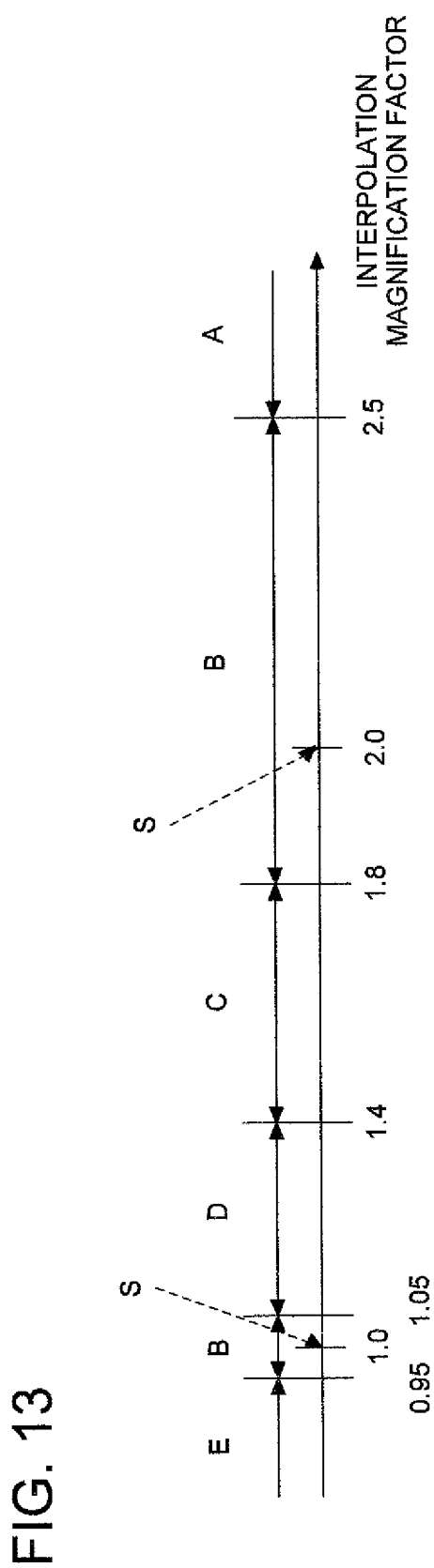
FIG. 13 is a diagram summarizing the result of functional evaluation shown in FIG. 12.

FIG. 13 is a diagram summarizing the result of functional evaluation shown in FIG. 12. The interpolation coefficient R is used as a reference. 1.4≦R≦1.8 is preferable, a slight deterioration in image quality can be reduced if any. Further, the interpolation coefficient of R>1.8 or in the vicinity of 1.0 times, namely, 0.95≦<R<1.05 is further preferable since there is almost no deterioration in image quality. The other range, namely, R<0.95 or 1.05<R<1.4, however, is not preferred since image quality may deteriorate. There was no difference in the result of diagnosis between the cases where the interpolation magnification factor was an integer and a non-integer (for example, 2.0 times and 2.1 times). With consideration given to difference in the character representation capacity, 5 was assigned in the case of 2.0 times, while B was given when the coefficient was not 2.0 times. The criteria are given in five grades—S, A, B, C, D and E—in the order of evaluation, starting from the most preferred case where the deterioration of image quality is the minimum.

The preferable relationship of the writing pitches in an image recording apparatus having a plurality of switchable writing pitches (n types where n≧2) will be described based on the result of the aforementioned "preferable magnification factor in the image recording apparatus".

The preferable relationship between the closest writing pitches Pi (where i=1, 2, . . . , n−1) and P (i+1) will be described. To ensure the level of interpolation magnification factor where there is a slight deterioration of image quality, which can be improved, it is preferred to satisfy the condition of 1.05<P (i+1)/Pi<1.4 for all i's. This is because the writing pitch can be selected so that it is not included in the range of interpolation magnification factor of 1.05<R<1.4.

The following describes a preferable relationship between the minimum writing pitch P1 and other writing pitches Pi (where i=2, . . . , n). To ensure higher image quality, an image should be recorded at a maximum resolution by the image recording apparatus. However, when the interpolation magnification factor is 1.05<R1<1.8 at P1, the deterioration of image quality may be caused by image interpolation. When this interpolation magnification factor is used, recording is carried out at the pitch Pi other than P1, and a preferable magnification factor of 0.95≦Ri<1.05 is employed. Then deterioration of the image caused by the image interpolation can be reduced.

The relational expression between the interpolation magnification factor and pitch is:

$$\therefore Ri = R1 \times P1/Pi$$

from Pi.Ri=const. (constant).

For a predetermined R1 within the range of 1.05<R1<1.8, when the condition of $$\therefore (R1/1.05) \leqq (Pi/P1) \leqq (R1/0.95)$$

is satisfied from $$0.95 \leqq R1 \cdot P1/Pi \leqq 1.05$$

then the image deterioration can be reduced using other writing pitch Pi, even if a large image deterioration has occurred at the minimum writing pitch P1.

For example, when R1=1.5, $$1.43 \leqq (Pi/P1) \leqq 1.58$$

The range of (Pi/P1) is as shown below:
[Range overlapped] (Pi/P1)=(0.95/0.95)=1.0
[Range not overlapped] (Pi/P1)=(1.05/0.95)=1.1 at the lower limit (R1=1.05).
[Range overlapped] (Pi/P1)=(1.8/0.95)=1.9
[Range not overlapped] (Pi/P1)=(1.8/1.05)=1.7 at the upper limit (R1=1.8).
Thus,
[Range overlapped] 1.0<(Pi/P1)<1.9

$$[\text{Range not overlapped}]\ 1.1 < (Pi/P1) < 1.7$$

If the condition of the above range is met, the deterioration of image quality can be reduced by recording another writing pitch Pi, even in the interpolation magnification factor (1.05<R1<1.8) where deterioration of image quality occurs at the minimum writing pitch P1. Further, the greater number of the Pi's meeting the condition of the aforementioned range covers more varied range of interpolation magnification factor.

From the above, it is preferred to satisfy 1.0<(Pi/P1)<1.9. To avoid duplication of the range of interpolation magnification factor whenever possible, it is still preferred to satisfy 1.1<(Pi/P1)<1.7.

Figure 14:
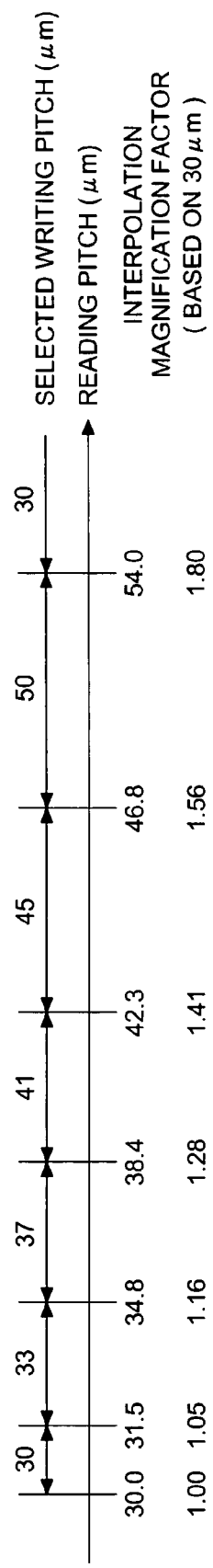
FIG. 14 is a diagram showing the correspondence between suitable reading pitches and writing pitches.

FIG. 14 is a diagram showing the correspondence between suitable reading pitches and writing pitches.

For example, when outputting the image with a reading pitch of 30 microns or more, almost all the magnification factors can be covered in the range of 1.05 through 1.8 times, if the selectable writing pitches consist of 30 microns (minimum pitch), 33 microns (interpolation magnification factor: 1.10 times), 37 microns (1.23 times), 41 microns (1.37 times), 45 microns (1.50 times) and 50 microns (1.67 times). This makes it possible to select a preferable writing pitch where deterioration of image quality can be reduced at a desired magnification factor of 1.0 times or more.

The following describes the optimum number of writing pitches based on the reading pitch: As described above, if many writing pitches can be selected in an image recording apparatus, the medical image of high definition can be provided, where the deterioration of image quality at the time of image interpolation can be reduced. In the present embodiment, a study has been made of the case where the image recording apparatus has two or three writing pitches, in order to improve the versatility of the image recording apparatus and to enhance processing efficiency.

FIG. 15 is a diagram showing interpolation magnification factor of the reading pitch with respect to the writing pitch and the evaluation thereof. It shows comparative examples where there is only one writing pitch that can be selected, and two or more embodiments. The writing pitch of the comparative example A is assumed as 50 microns, that of the comparative example B as 40 microns, that of the comparative example C as 30 and 60 microns, that of the comparative example D as 30 and 40 microns, and that of the comparative example E as 30, 40 and 50 microns.

Based on the aforementioned preferable range of the interpolation magnification factor, the criteria are given in five grades—S, A, B, C, D and E—in the order of evaluation, starting from the most preferred case where deterioration of image quality is the minimum. As shown in FIG. 15, in the comparative example A, D or F is assigned to three reading pitches, C to one reading pitch, and B or better score to only three reading pitches. In the comparative example B, D is assigned to two reading pitches, C to two reading pitches, and B or better score to four reading pitches. In the embodiment C, D is assigned to one reading pitch, C to one reading pitch, and B or better score to six reading pitches.

In the embodiment D, by contrast, C was assigned to one reading pitch, and B or better score to seven reading pitches. In particular, S was assigned to five reading pitches. In the diagram, the evaluation with plain background to the writing pitch of 30 microns is applied, while the writing pitch of 30 microns is applied to the evaluation with the hatched background.

There are a greater number of the preferable values of reading pitches in the embodiment with two or more writing pitches than in the comparative example with one writing pitch. There are a greater number of the preferable values of reading pitches in the embodiment D where writing pitches are not integral multiples than in the embodiment C where writing pitches are integral multiples of each other. Further, in the embodiment E with three writing pitches, there is no deterioration of image quality for almost all the values of reading pitches, and this configuration is preferable. Thus, the configuration of the present embodiment where switching is performed between two or more writing pitches is preferable. The configuration with three or more writing pitches is more preferable, and that of writing pitches being independent of the relationship of integral multiple is still more preferable.

Accordingly, when the image recording section 17 has at least two—or preferably three—selectable writing pitches, it is possible to select the preferable writing pitch for the medical image covering a wide variety of reading pitches and to generate a high-quality medical image. This arrangement is applicable to the medical image recording system of high versatility provided with various types of image recording apparatuses. Sufficient effects can be provided when there are two writing pitches. When there are three or more writing pitches, other writing pitches can serve as a complement over the considerable ranges of the reading pitches for which the minimum writing pitch is not suited, and this arrangement is preferable. Further, when there are four or more writing pitches, other writing pitches can serve as a complement over almost all the ranges of the reading pitches for which the minimum writing pitch is not suited, and this arrangement is more preferable.

In order that the interpolation magnification factor is 0.95 or more, the size of the writing pitch is preferred to be smaller than that of the reading pitch. To render a minute structure, the writing pitch is preferred to be smaller. Thus, the smaller the writing pitch, the better for the interpolation magnification factor and rendering capacity.

For example, to ensure that the image containing the information of space frequency equivalent to 10 Cy/mm can be outputted, the minimum value of writing pitch P1 is preferred to be 50 microns or less. Since the reading pitch that enables the generation of the high-quality mammographic image data is 50 microns or less, the writing pitch is preferred to be 50 microns or less.

Further, to ensure that the image containing the information of space frequency equivalent to 14 Cy/mm can be outputted, the minimum value of writing pitch P1 is more preferred to be 35 microns or less. If the writing pitch is 35 microns or less, the interpolation magnification factor for the reading pitch of 50 microns required for mammography is 1.4 times or more, and the minimum image quality is guaranteed (See FIG. 13). Thus, it is still more preferred that the writing pitch be 35 microns or less.

In the diagnostic image such as CR in the case of medical image, the life-size output (full-size output) is produced, and the interpolation magnification factor lies in the range from 1.0 through 2.0 times. Further, in the diagnostic image of CT/MRI and others, the outputs of various sizes are produced, the interpolation magnification factor are 2.0 times or more in most cases. The diagnostic image of CR or the like is subjected to the influence of deterioration of image quality. However, if the life-sized output is assumed, the interpolation magnification factor will be limited in practice. There is no need of covering the entire range.

To determine the preferable writing pitch, the following method can be used: The interpolation magnification factor corresponding to each writing pitch is calculated based on the given reading pitch, and the criteria shown in FIG. 13 are created. The optimum interpolation magnification factor out of the interpolation magnification factor that can be realized, and the optimum writing pitch are selected. As shown in FIG. 14, it is also a preferable method to create a table of correspondence between the reading pitch and writing pitch in advance and to determine a preferable reading pitch directly from the information on the given reading pitch.

The higher the interpolation magnification factor, the smaller the deterioration of image quality. Accordingly, selection of the minimum writing size provides the optimum result in many cases, at the sacrifice of increased size of the image data subsequent to interpolation and increased time for processing. Thus, with consideration given to the interpolation time and memory area, it is preferred that the writing pitch be selected so that the interpolation magnification factor does not exceed a predetermined value.

If the interpolation magnification factor has been determined, the site of the image data subsequent to interpolation is determined uniquely. Thus, determining the interpolation magnification factor is virtually equivalent to determining the size of the image data subsequent to interpolation.

As described above, it is also possible to arrange such a configuration that the writing pitch for recording is determined based on the interpolation magnification factor. This arrangement allows deterioration of image quality to be reduced by the preferable writing pitch conforming to the reading pitch out of a plurality of writing pitches, and ensures the image of the image data to be recorded.

If at least one of a plurality of writing pitches satisfies 1.0<(Pi/P1)<1.9, the deterioration of image quality can be reduced and the image data can be interpolated by using another writing pitch Pi, even if deterioration of image quality occurs at the minimum writing pitch P1. If at least one of a plurality of writing pitches satisfies 1.1<(Pi/P1)<1.8, the deterioration of image quality can be reduced and the image data can be interpolated by using another writing pitch Pi, without overlapping the range of interpolation magnification factor wherever possible, even if deterioration of image quality occurs at the minimum writing pitch P1.

The values for reading pitch and writing pitch used in the present embodiment represent only an example, and are not restricted thereto.

If it is possible to set the variable writing pitch mode where switching is performed between the writing pitches used to record the image data based on the supplementary information, or the fixed writing pitch mode where the writing pitch is fixed independently of the supplementary information, then the writing pitch can be determined in a flexible manner, depending on conformance or non-conformance to the supplementary information.

It is also possible to arrange such a configuration that there is a combination where the reading pitch of the image generating apparatus is the integral multiple of writing pitch of the image recording apparatus. This configuration allows the writing pitch of this combination to be determined, and deterioration of image quality to be reduced by the more preferable writing pitch out of a plurality of writing pitches, and ensures the image of the image data to be recorded.

Further, it is also possible to make such arrangements that, if there is a combination where the reading pitch of the image generating apparatus is the integral multiple of writing pitch of the image recording apparatus, the writing pitch of this combination is determined. This arrangement allows deterioration of image quality to be reduced by the more preferable writing pitch out of a plurality of writing pitches, and ensures the image of the image data to be recorded.

It is also possible to make such arrangements that there is a combination where the value obtained by dividing the reading pitch by the interpolation magnification factor is an integral multiple. This arrangement allows the writing pitch corresponding to this combination to be determined, and deterioration of image quality to be reduced by the more preferable writing pitch conforming to the reading pitch, out of a plurality of writing pitches, and ensures the image of the image data to be recorded.

It is also possible to make such arrangements that, if there is a combination where the value obtained by dividing the reading pitch by the magnification ratio of radiography is an integral multiple, the writing pitch corresponding to this combination is determined. This configuration allows the image to be recorded by a more preferable writing pitch without deterioration of image quality when the image obtained by magnification is recorded at a life-size.

In the present embodiment, one image recording apparatus is used, without the present invention being restricted thereto. For example, a plurality of image recording apparatuses, views for displaying image data, databases for recording the image data and such devices can be connected via the network bus 60.

Embodiment 2

Figure 16:
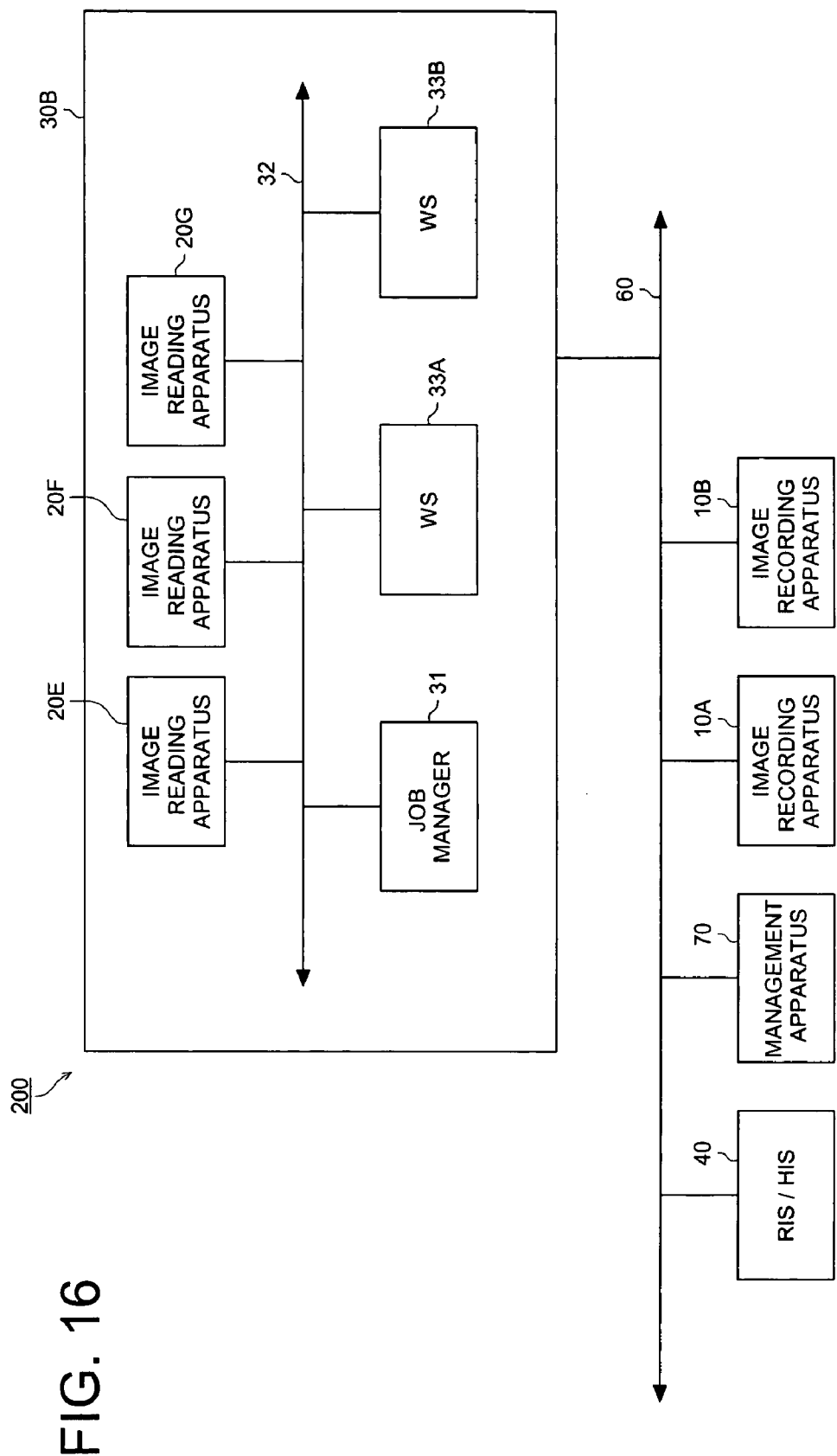
FIG. 16 is a block diagram representing a medical image recording system 200 as a second embodiment of the present invention.
Figure 17:
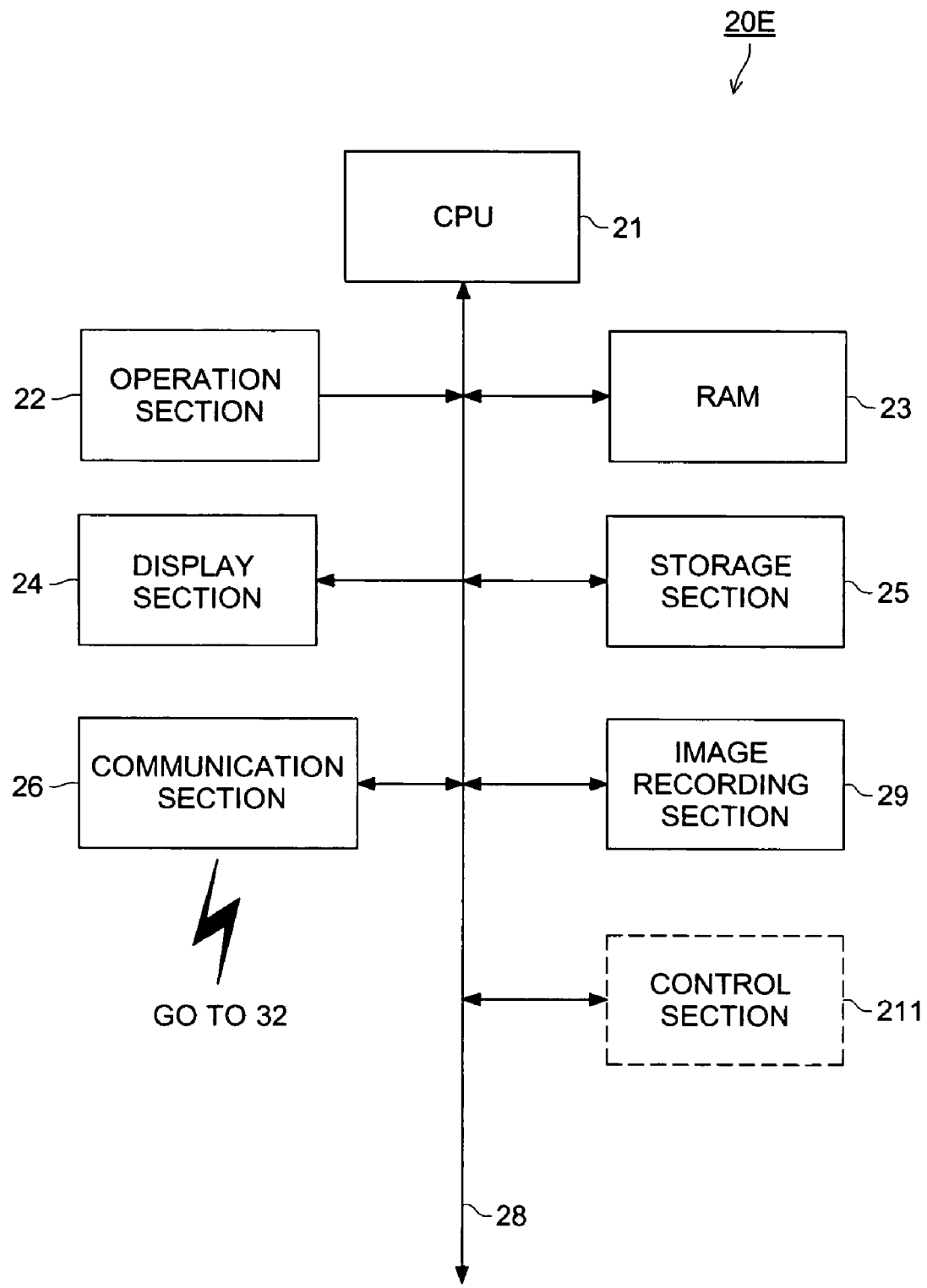
FIG. 17 is a block diagram representing the interior of an image reading apparatus 20E.
Figure 18:
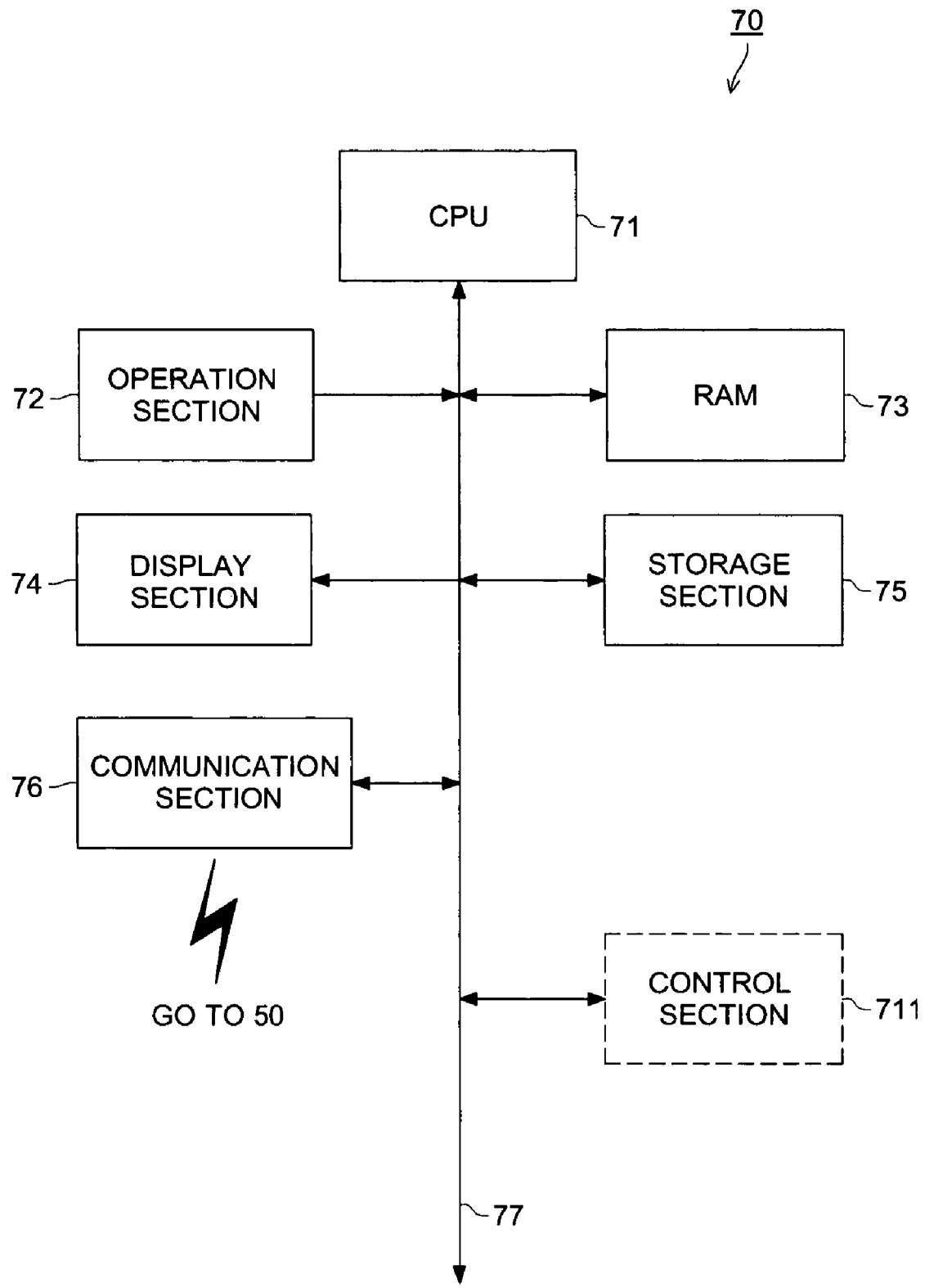
FIG. 18 is a block diagram representing the interior of a management apparatus 70.

Referring to FIGS. 16 through 21, the following describes the second embodiment of the present invention. In the first place, the configuration of the apparatus in the present embodiment will be described with reference to FIGS. 16 through 21. FIG. 16 is a block diagram representing a medical image recording system 200 as the present second embodiment. FIG. 17 is a block diagram representing the interior of an image reading apparatus 20E, and FIG. 18 is a block diagram representing the interior of a management apparatus 70.

The configuration of the apparatus in the present embodiment will be described. As shown in FIG. 16, the medical image recording system 200 in the present embodiment consists of:

image recording apparatuses 10A and 10B;

a CR network 30A including the image reading apparatuses 20E, 20F and 20G;

a RIS/HIS 40; and a management apparatus 70 as a management apparatus. The image recording apparatuses 10A and 10B, CR network 30B, RIS/HIS 40 and management apparatus 70 are connected to the network bus 60 for communication.

The CR network 30B consists of:

image reading apparatuses 20E, 20F and 20G;

WSs 33A and 33B capable of identifying the image of the radiographed patient by getting radiographic/inspection order information from the RIS/HIS 40, and associating the inspection order information, used cassette ID, radiographic conditions and image processing conditions; and a JOB manager 31 for determining the WS as a distribution destination of the image read by the image reading apparatuses 20E, 20F and 20G, and distributing the control conditions of the image reading apparatuses 20E, 20F and 20G.

The image reading apparatuses 20E, 20F and 20G employ a CR cassette. A cassette is carried into a hospital or the like by an engineer, based on the radiographic/inspection order information from the RIS/HIS 40 or others, and the patient's lesion is subjected to CR scanning. After that, the CR-scanned cassette is carried to one of the image reading apparatuses 20E, 20F and 20G, for example, to the image recording apparatus 20E, and is set in position. The image reading apparatus 20E reads the image data from the image of the set cassette at a reading pitch of 50 microns for mammographic image or at a reading pitch of 87.5 microns for general image, and sends the read image data to the WS 33A, for example. The read image data is sent to the WS specified by the JOB manager 31, for example, to the WS 33A. After having been displayed and verified on the WS 33A, the supplementary information is added to the image data by the WS 33A. Then the image data in a DICOM-compatible data format is sent to the management apparatus 70.

As mentioned above, a combination of the image reading apparatuses 20E, 20F, or 20G and WSs 33A or 33B can provide the image generating apparatus with a function to create image data including the supplementary information.

Referring to FIG. 17, the following describes the interior of the image reading apparatus 20E: The image reading apparatuses 20F and 20G have the same configuration as the image reading apparatus 20E. As shown in FIG. 17, the image reading apparatus 20E can be provided with an image recording section 29, instead of the image generating section 27, in the configuration of the image generating apparatus 20A shown in FIG. 2. To avoid duplication, the following mainly describes the differences from the image generating apparatus 20A.

The storage section 25 contains a second image generation program.

The communication section 25 is connected to a network bus 32. The cassette where the lesion of a patent as a subject is CR-scanned is set on the image recording section 29. Image data is read at a reading pitch of 50 or 87.5 microns from the image recorded on the cassette.

Based on the supplementary information of the image data received from the image reading apparatus 20E, the management apparatus 70 determines the image recording apparatus as a destination of distribution from the 10A and 10B, and sends the image data to the image recording apparatus.

As shown in FIG. 18, the management apparatus 70 consists of a CPU 71, an operation section 72, a RAM 73, a display section 74, a storage section 75, a communication section 76 and a bus 77. A control section 711 is formed by the collaboration between the central processor unit 71 and a program expanded on the RAM 73. The CPU 71, operation section 72, RAM 73, display section 74, storage section 75, communication section 76, control section 711 and bus 77 of the management apparatus 70 are the same as the CPU 11, operation section 12, RAM 13, display section 14, storage section 15, communication section 16, control section 111 and bus 18 of the image recording apparatus 10, respectively. The storage section 75 contains an image data distribution program.

The image recording apparatuses 10A and 10B records the image data sent from the management apparatus 70 on the recording medium at a predetermined fixed writing pitch. The writing pitch of the image recording apparatus 10A is 43.75 microns, and the writing pitch of the image recording apparatus 10B is 25 microns.

The internal structure of the image recording apparatuses 10A and 10B is the same as that of the image recording apparatus 10 shown in FIG. 2, provided that the second image recording program is recorded in the storage section 15 of the image recording apparatuses 10A and 10B. Further, the image recording section 17 of the image recording apparatus 10A records the image data on the recording medium at a writing pitch of 43.75 microns. The image recording section 17 of the image recording apparatus 10B records the image data on the recording medium at a writing pitch of 25 microns.

Figure 19:
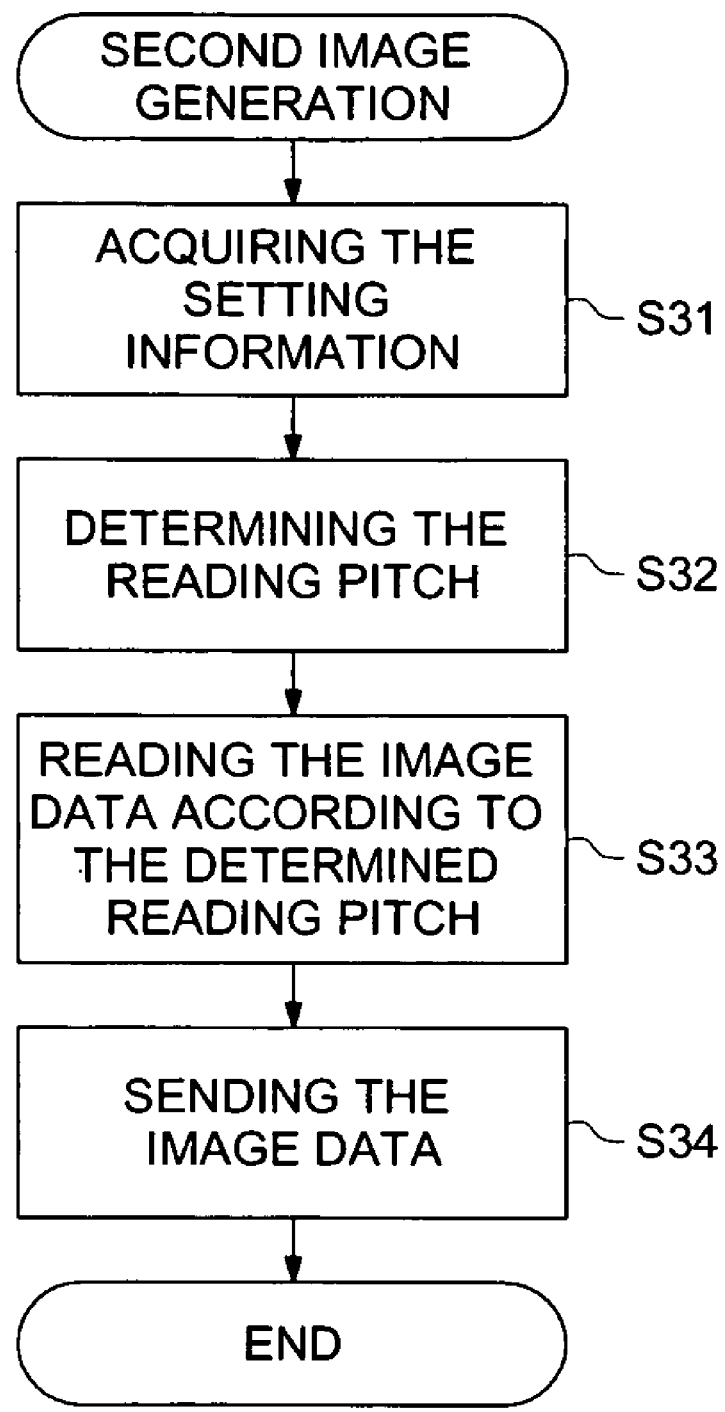
FIG. 19 is a flowchart representing the second processing of image generation to be applied by the image reading apparatus 20E.
Figure 20:
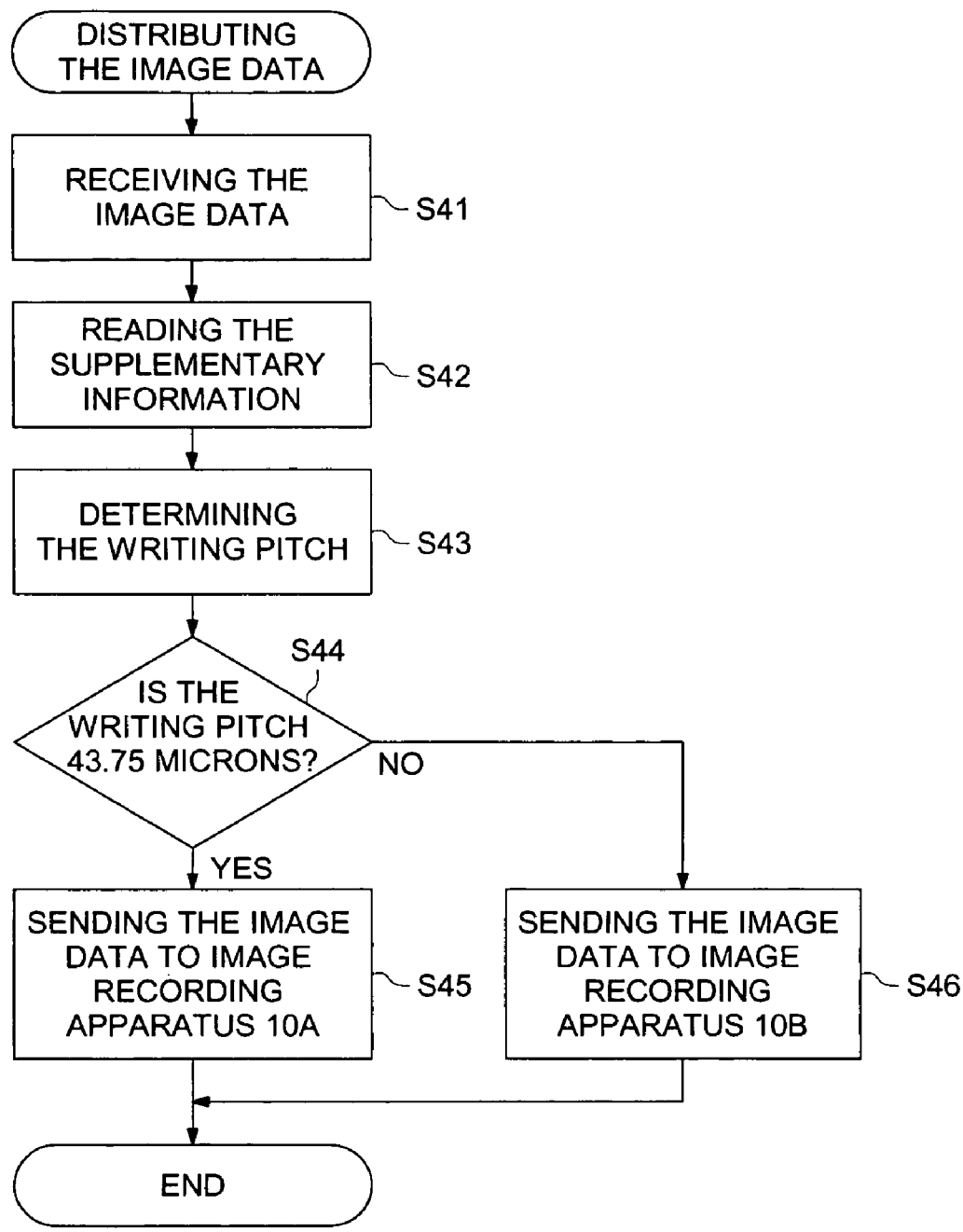
FIG. 20 is a flowchart representing the processing of image data distribution applied by the management apparatus 70.
Figure 21:
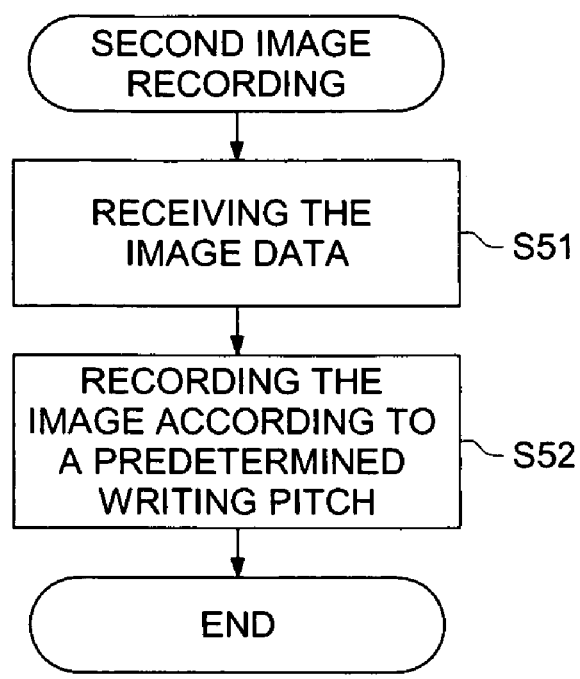
FIG. 21 is a flowchart representing the second processing of image processing applied by the image recording apparatuses 10A and 10B.

Referring to FIGS. 19 through 21, the following describes the operation of the medical image recording system 200 of the present embodiment. FIG. 19 represents the second processing of image generation to be applied by the image reading apparatus 20E. FIG. 20 represents the processing of image data distribution applied by the management apparatus 70. FIG. 21 represents the second processing of image processing applied by the image recording apparatuses 10A and 10B.

With reference to FIG. 18, the following describes the processing of the second image generation where the image reading apparatus 20E reads image data from the cassette where a CR-scanned image of the patient's lesion is recorded, and sends the image data to the management apparatus 70. A CR-scanned cassette of the patient's lesion is set on the image recording section 29 in advance.

Immediately when the instruction of starting the processing of second image generation has been inputted from the operation section 22 by an operator in the image reading apparatus 20E, the CPU 21 reads the second image generating program stored in the storage section 25 and expands it in the RAM. The processing of second image generation is executed by the collaboration between the second image generating program expanded in the RAM 23 and the CPU 21. The following description assumes that the subject of processing in each step refers to the control section 211 unless otherwise specified.

As shown in FIG. 19, the control section 211 receives from the WS 33 the information on various settings for image reading including reading pitches through the network bus 32 and communication section 26 (Step S31). In Step S31, it is also possible to arrange such a configuration that information on various settings is inputted from the operation section 22 by the operator and is received by the control section 211; alternatively, the information on various settings is received from the WS 33 and through input from the operation section 22.

Based on the information on various settings obtained in Step S31, the reading pitch (87.5 microns or 50 microns in the present embodiment) is determined (Step S32). The image recording section 29 reads the image data according to the reading pitch determined in Step S32 from the image recorded in the cassette (Step S33).

The read image data is sent to the WS 33A or 33B through the network bus 32 (Step S34), and the processing of second image generation terminates. Upon termination of the processing of second image generation, the WS 33A or 33B having received the image data adds supplementary information to the image data after the image data has been displayed and checked by the manager of the received image data. The image data is sent to the management apparatus 70 through the network buses 32 and 50. Similarly to the case of the first embodiment, the supplementary information includes the information on the writing pitch used to record the image of the image data in the image recording apparatuses 10A and 10B.

Referring to FIG. 20, the following describes the processing of image data distribution for distributing the image data received from the WS 33A or 33B to the image recording apparatus 10A or 10B by in the management apparatus 70.

Upon receipt of the image data from the WSs 33A and 33B through the network buses 32 and 60 and communication section 76 in the management apparatus 70, the CPU 71 reads the image data distribution program stored in the storage section 75 and expands it in the RAM 73. The processing of image data distribution is executed by the collaboration between the image data distribution program expanded in the RAM 23 and the CPU 71. The following description assumes that the subject of processing in each step refers to the control section 711 unless otherwise specified.

As shown in FIG. 19, the image data is received from the WSs 33A and 33B through the network buses 32 and 60 and communication section 76 (Step S41). Then the supplementary information of the image data received in Step S41 is read out to acquire the radiographing conditions and reading pitch contained in this supplementary information (Step S42).

Then the writing pitch for supplementary information is determined (Step S43). For example, similarly to the case of Step S23 in the processing of first image generation given in FIG. 5, a preferable writing pitch is determined through selection from the writing pitches 43.75 and 25 microns corresponding to the image recording apparatuses 10A and 10B.

Evaluation is made to determine whether the writing pitch determined in Step S43 is 43.75 microns or not (Step S44). If the writing pitch is 43.75 micron (Step S43; YES), then the image data received in Step S41 is sent to the image recording apparatus 10A corresponding to the writing pitch of 43.75 microns through the communication network 76 and network bus 60, and the processing of image data distribution terminates.

If the writing pitch is not 43.75 micron (Step S44; NO), then the writing pitch is 25 microns. The image data received in Step S41 is sent to the image recording apparatus 10B corresponding to the writing pitch of 25 microns through the communication network 76 and network bus 60 (Step S46), and the processing of image data distribution terminates.

Referring to FIG. 21, the following describes the processing of image data distribution where the data of the image data received from the management apparatus 70 is recorded by the image recording apparatuses 10A and 10B.

Upon start of receiving the image data from the management apparatus 70 through the network bus 60 and communication section 16 in the image recording apparatuses 10A and 10B, the CPU 11 reads the second image recording program stored in the storage section 15 and expands it in the RAM 13. The processing of second image recording is executed by the collaboration between the second image recording program expanded in the RAM 13 and the CPU 11. The following description assumes that the subject of processing in each step refers to the control section 111 unless otherwise specified.

As shown in FIG. 21, the image data including the supplementary information is received from the management apparatus 70 through the network bus 60 and communication section 16 (Step S51). The image data received in Step S51 is interpolated by a predetermined writing pitch, and is recorded on the recording medium. At the same time, the value of the writing pitch is recorded on the recording medium (Step S52), and the processing of second recording terminates. A predetermined writing pitch in the image recording apparatus 10A is 43.75 microns corresponding to the general radiographic image. A predetermined writing pitch in the image recording apparatus 10B is 25 microns corresponding to the mammographic image.

According to the present embodiment, the image data is inputted according to a predetermined reading pitch in the image reading apparatuses 20E, 20F and 20G. Supplementary information is added to the image data in the WSs 33A and 33B. In the management apparatus 70, the writing pitch used to record the image of the image data is determined based on the image data received from the WSs 33A and 33B, and the image data is sent to the image recording apparatus corresponding to the determined writing pitch. In the image recording apparatuses 10A and 10B, the image data received from the management apparatus is interpolated by a predetermined writing pitch, and is recorded on the recording medium. Thus, the image data read by the image reading apparatus using a plurality of reading pitches can be recorded, while deterioration of image quality is reduced by a predetermined writing pitch, in the image recording apparatus of the preferable writing pitch conforming to the supplementary information out of a plurality of image reading apparatuses.

The image generating apparatus, management apparatus and image recording apparatus are connected through the network. This arrangement permits a preferred and varied communication connection configuration to be formed.

Embodiment 3

Figure 22:
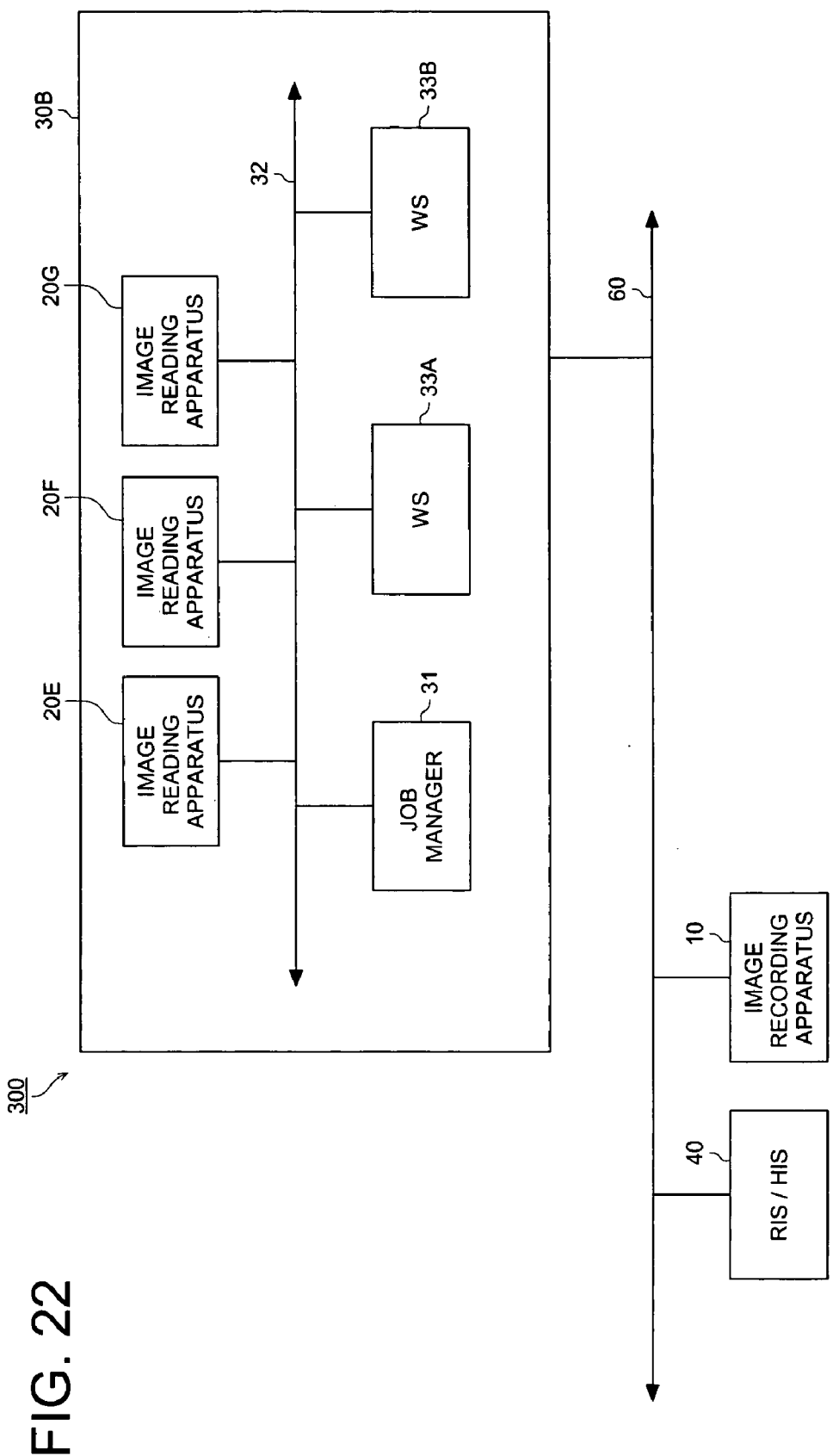
FIG. 22 is a block diagram representing a medical image recording system 300 as a third embodiment of the present invention.

Referring to FIG. 22, the following describes the third embodiment of the present invention. FIG. 22 is a block diagram representing a medical image recording system 300 as a third embodiment.

The following describes the apparatus arrangement of the present embodiment: As shown in FIG. 22, the medical image recording system 300 includes an image recording apparatus 10; a CR network section 30B containing the image reading apparatuses 20E, 20F and 20G; and a RIS/HIS 40. Further, the CR network section 30B and RIS/HIS 40 are connected to the network bus 60 for communication.

In the present embodiment, each of the image reading apparatuses 20E, 20F and 20G is capable of reading the image data in two reading pitches: 87.5 and 50 microns, while the image recording apparatus 10 is capable of recording the image data in two writing pitches: 43.75 and 25 microns.

The following describes the operation of the medical image recording system 300: In the first place, the processing of second imager generation shown in FIG. 19 is performed in the image reading apparatuses 20E, 20F and 20G. After execution of the Step S35, in the WS 33A or 33B, the image data including the supplementary information is sent to the image recording apparatus 10 through the network buses 32 and 60, subsequent to reception, display and confirmation of the image data and addition of supplementary information thereto. The same description applies to other steps.

Figure 6:
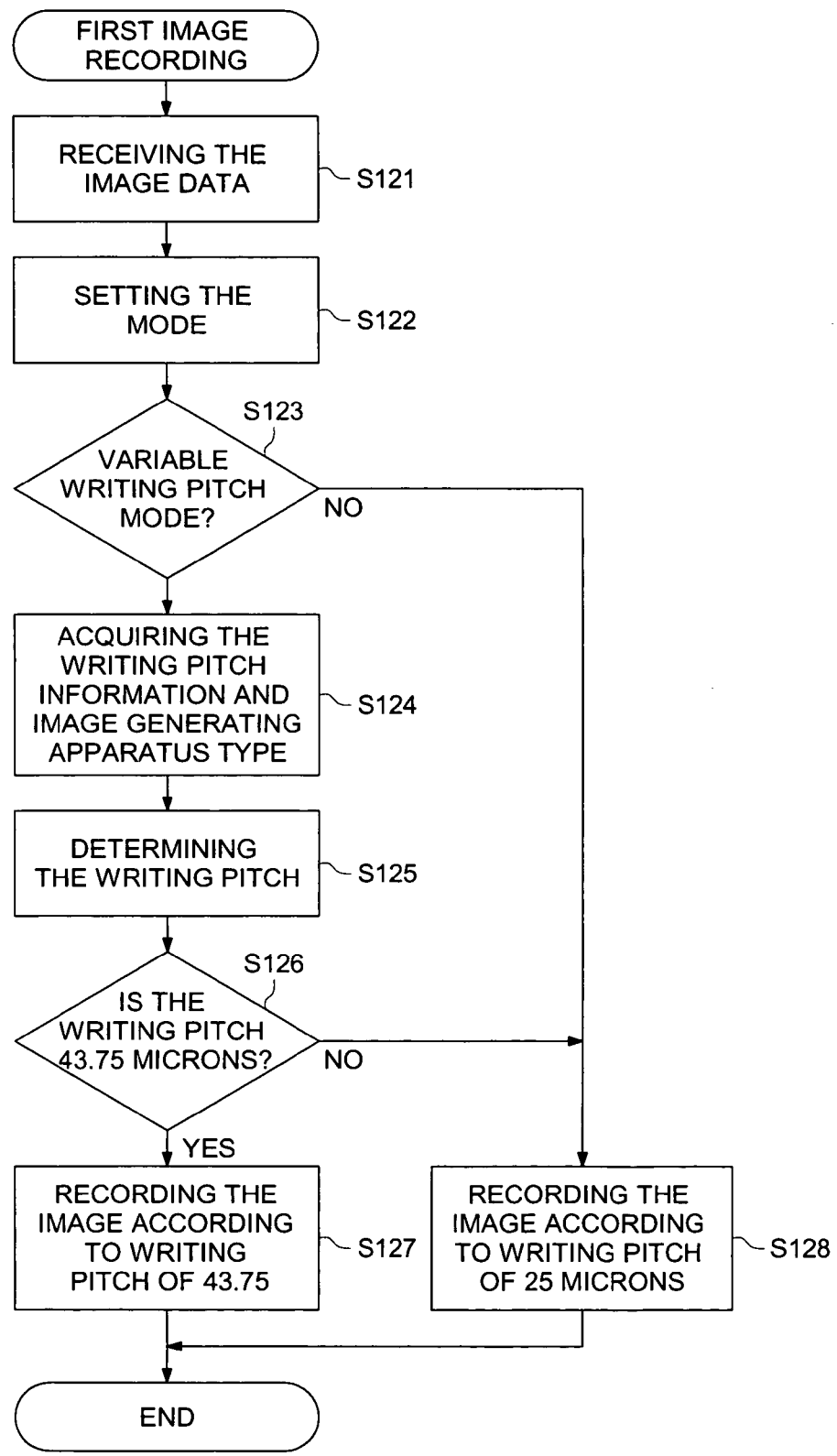

In the image recording apparatus 10, processing of the first image recording shown in FIG. 6 is performed, as described in the first embodiment. In Step S21, the image data containing the supplementary information containing the information for determining the writing pitch is received from the image reading apparatus 20E through the network bus 60 and communication section 16. The same description applies to other steps.

According to the present embodiment, a predetermined reading pitch is determined from a plurality of reading pitches in the image reading apparatuses 20E, 20F and 20G, and the image data is generated according to the reading pitch. In the WSs 33A and 33B, supplementary information is added to this image data. In the image recording apparatus 10, the writing pitch used to record the image of the image data is determined based on the supplementary information of the image data received from the WSs 33A and 33B, and the image data is interpolated according to the writing pitch so that the image is recorded on a recording medium. Thus, the image data generated by the image reading apparatus using a plurality of reading pitches can be recorded, while deterioration of image quality is reduced by a preferable writing pitch conforming to the supplementary information out of a plurality of writing pitches.

The description in the aforementioned embodiments refers to only an example of the medical image recording system of the present invention, without the present invention being restricted thereto.

The CT, CR and MRI apparatuses have been used in the aforementioned embodiments. Without being restricted to them, the present invention allows use of an image generating apparatus for patient's lesion in the form of FPD or the like. In the aforementioned embodiments, photothermal silver halide method is used in the image recording section of the image recording apparatus. Without being restricted to them, the present invention also permits an image to be recorded according to another method such as a photosensitive thermal color development image recording method based on a photosensitive thermal development recording material and photosensitive thermal recording material.

Embodiment 4

Figure 23:
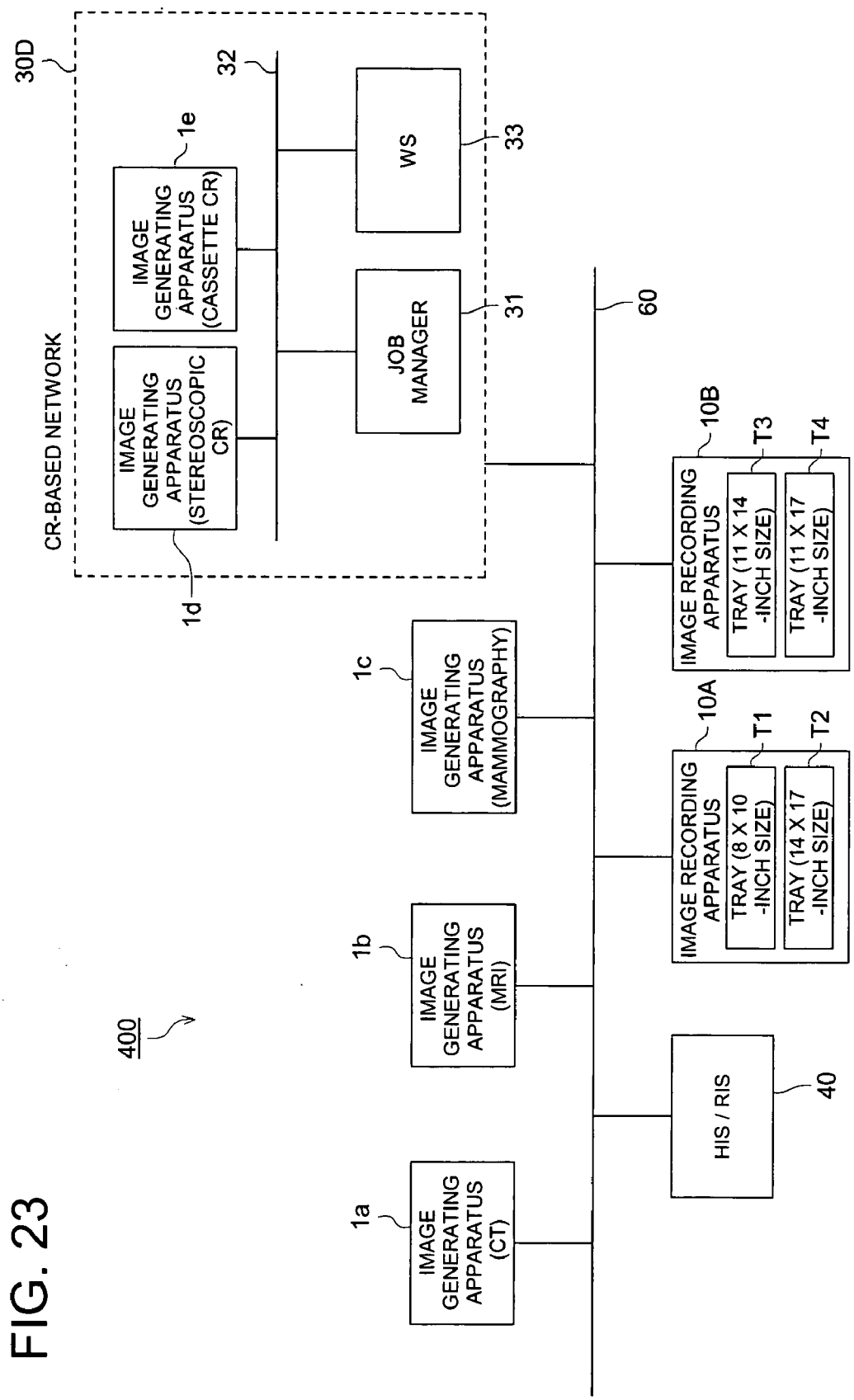
FIG. 23 is a drawing showing the system configuration of a medical image system as a fourth embodiment of the present invention.

FIG. 23 is a conceptual diagram showing the system configuration of a medical image system 400. As shown in FIG. 23, the medical image system 400 is connected with the image generating apparatuses 1a through 1e, image recording apparatuses 10A and 10B, HIS/RIS 40 and JOB manager 31 WS (Workstation) 33 through the network 60 so that data can be exchanged between them. Further, the image recording apparatuses 1d and 1e, JOB manager 31 and WS 33 constitute a CR network section 30D.

The network N is applicable to various forms of communication lines such as a LAN (Local Area Network), WAN (Wide Area Network) and the Internet. If permitted in a medical organization such as a hospital, it is also applicable to the radio communication or infrared communication line. Since important patient information is included, the information to be exchanged should be encrypted. The DICOM (Digital Image and Communications in Medicine) Standard is used for communication in the hospital. In the communication between the aforementioned image generating apparatuses 1a through 1e and image recording apparatuses 10A and 10B, DICOM MWM (Modality Worklist Management) and DICOM MPPS (Modality Performed Procedure Step) are used.

The image generating apparatuses 1a through 1e consist of a CR, FPD, CT, MRI and mammograph, for example. They scan the subject, digitally converts the radiographic image and create a medical image. The fourth embodiment will be described assuming that the image generating apparatus 1a is a CT, the image generating apparatus 1b a MRI, the image generating apparatus 1c a mammograph, the image generating apparatus 1d a stereoscopic CR, and the image generating apparatus 1e a cassette CR, for example.

The image generating apparatuses 1a through 1e conforms to the aforementioned DAICOM Standard. If they fail to conform to the DAICOM, a DICOM converter (not illustrated) can be used to input the supplementary information of the DICOM, or the JOB manager 31 to be described later or WS 33 can be used to generate the supplementary information so that the supplementary information will be attached to the medical image.

The image recording apparatuses 10A and 10B output the hardcopy of the image data supplied by the image generating apparatuses 1a through 1e by reproducing it as a visible image. They consist, for example, of various types of dry printers using an X-ray laser, heat mode laser or thermal head.

Figure 24:
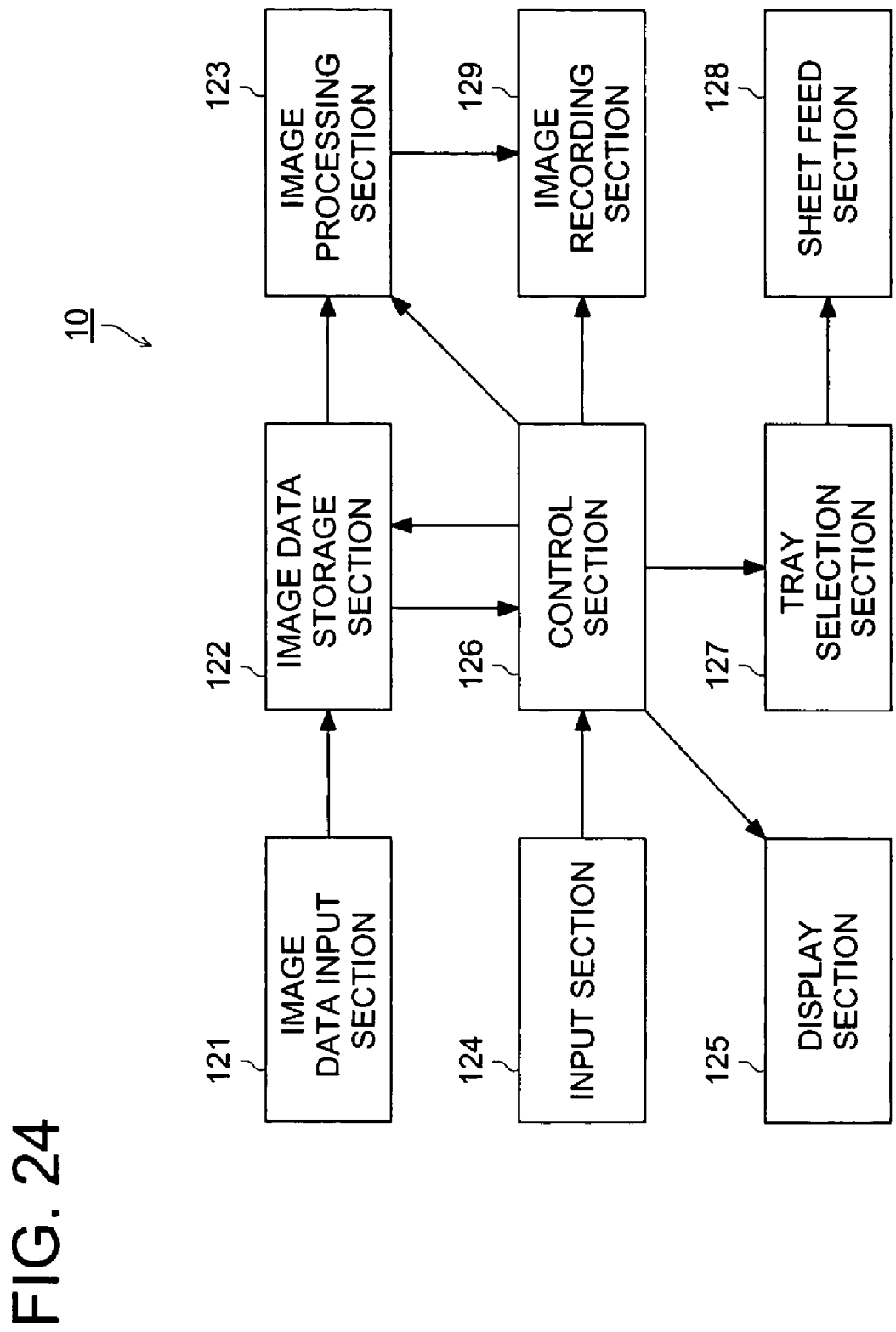
FIG. 24 is a block diagram representing the functional configuration of the image recording apparatus 10 given in FIG. 23.

Referring to FIG. 24, the following describes the details of the image recording apparatuses 10A and 10B: The image recording apparatuses 10A and 10B have approximately the same structure. Accordingly, the same portions will be assigned with the same numerals of reference, and the image recording apparatus 10A as a representative will be described. FIG. 24 is a block diagram representing the functional configuration of the image recording apparatus 10A. As shown in FIG. 24, it is composed of an image data input section 121, image data storage section 122, image processing section 123, input section 124, display section 125, control section 126, sheet feed section 127, tray selection section 128, image recording section 129 and others.

The image data input section 121 receives digitally converted medical image from image generating apparatuses 1a through 1c through the network 60. The image data input section 121 can be arranged in such a way as to read the medical image data from various types of storage mediums such as a CD-ROM (Compact Disk-Read Only Memory) and floppy (registered trademark).

It is also possible to make such arrangements that the image data input section 121 is a laser digitalizer arranged separately from the image recording apparatus 10, wherein the film containing the medical image recorded by radiographing a patient is scanned by laser beam, and the amount of light passing through it is measured; then the measurement is subjected to analog-digital conversion so that the medical image as a digital image data is inputted into the image recording apparatus 10.

The image data input section 121 is not restricted to the aforementioned laser digitizer. It is also possible to make such arrangements that the film containing the recorded medical image is optically scanned by such a light detecting device as a CCD (charge coupled device), and the reflected light is subjected to photoelectric conversion by the CCD so that the digital image data is inputted.

It is also possible to make such arrangements that the image data input section 121 can be connected to the image-capturing apparatus that generates the medical image data by digital conversion of the medical image scanned by a stimulable phosphor, instead of reading the medical image recorded on the film, wherein digital image data is inputted into the image recording apparatus 10 from this image-capturing apparatus. In this case, a film need not be used, and this means a cost reduction.

It is also possible to make such arrangements that the image data input section 121 can be connected to the FPD that scans the radiographic image and outputs it as an electric signal, and the image data is inputted from this FPD. As described in the Official Gazette of Japanese Patent Tokkaihei 6-342098, the FPD consists of a radiation detecting device for generating electric charge in response to the intensity of the applied radiation, and a capacitor for storing the electric charge generated by this radiation detecting device, wherein the aforementioned radiation detecting device and capacitor are arranged in a two-dimensional form.

As described in the Official Gazette of Japanese Patent Tokkaihei 9-90048, the image data input section 121 can be provided with a light detector that is equipped, for each pixel, with a light detecting device such as a photodiode for detecting the intensity of the fluorescent light, a CCD and a CMOS (Complementary Metal Oxide Semiconductor) sensor. Radiation is absorbed by a phosphor layer such as an X-ray intensifying screen so that fluorescent light is emitted, and the intensity of the fluorescent light is detected by a light detector. Then digital medical image data is inputted subsequent to photoelectric conversion. Such a configuration can also be arranged. Further, it is possible to make such arrangements that a radiation scintillator that emits visible light through application of radiation, a lens eye and an area sensor conforming to each lens are combined.

The medical image data inputted by the image data input section 121 is provided with a header area, and this header area contains the supplementary information in conformity to the DICOM Standard, wherein the supplementary information includes information on medical image; patent information such as patient's name, his or her ID (ID for identification of each patient) and his or her gender; radiographic information such as radiographed site and date of radiographing; and inspection ID (ID for identification of each inspection) showing the type of inspection which the image is to receive.

The image data storage section 122 is composed of a magnetic/optical recording medium or semiconductor memory or the like, and stores the medical image data inputted by the image data input section 121. In this case, data compression is carried out, as required.

In order to make data compression, the use of the known JPEG, DPCM and wavelet compression methods can provide either reversible or non-reversible data compression, but the reversible data compression, free of deterioration of image quality induced by data compression, is preferred.

The image processing section 123 applies image processing to the medical image data inputted from the image data storage section 122, and outputs it to the image recording section 129. There are various types of image processing that include:

gradation processing for adjusting the image contrast;

contrast correction processing;

frequency enhancement processing for adjusting the image sharpness;

dynamic range compression processing for keeping the image of wide dynamic range in the clearly visible density range, without reducing the contrast of the details of the subject; and interpolation processing for life-size outputting of the medical image different in the read image size and recorded image size.

The input section 124 consists of a keyboard, a mouse and others. It generates the instruction signal conforming to the inputted instruction, and outputs it to the control section 126. To put it more specifically, information on the recording medium size to be described later, the recorded pixel size and the tray as an output destination is inputted in the setting mode set by the control section 126, and is outputted to the control section 126.

Display means consisting of a CRT (cathode ray tube), an LCD (liquid crystal display) and a plasma display is used as a display section 125, which outputs the display information inputted from the communication section 126.

The control section 126 acquires the supplementary information of the DICOM attached to the header of the medical image stored in the image data storage section 122, and obtains information on the read pixel size of a medical image. In response to the read pixel size of the medical image, the control section 126 calculates the recorded pixel size for life-size outputting, and outputs the control signal for adjusting the writing pitches, to the image recording section 129. Further, when the DICOM supplementary information does not contain information on the read pixel size, the control section 126 acquires the read pixel size, based on the size of the recording medium specified as an output destination, radiographed site and image generating apparatus identification information, and determines the recorded pixel size, namely, the writing pitch.

In this case, the control section 126 is provided with a RAM (not illustrated) and the RAM has a table 261 containing the information on the read pixel size, recorded pixel size and tray as an output destination, corresponding to various information contained in the DICOM supplementary information. For example, when the supplementary information contains the size of the recording medium specified as an output destination, the medical image is evaluated as a mammographic image, if the specified recording medium size is an 8×10-inch size. Then the read pixel size and recorded pixel size corresponding to the mammography are determined, based on the table 261.

FIG. 25 is a diagram showing an example of the data configuration of the table 261 stored in the RAM of the control section 126. As shown in FIG. 3, the table 261 stores recording medium size, read pixel size and recorded pixel size (writing pitch) in conformity to the type of the apparatus. For example, when the apparatus is a CR, the recording medium is a 14×17-inch sized recording medium, and the read pixel size is 87.5 microns. The recorded pixel size is 43.75 microns and the tray as an output destination is set to tray T2. It should be noted that the data configuration of the table 261 is only an example. The recording medium size, read pixel size and recorded pixel size can be set in details in conformity to various types of the apparatuses.

Settings of the recording medium size, recorded pixel size and tray as an output destination can be changed in response to the requirements of the user, as appropriate. To put it another way, the table 261 is capable of storing the recording medium size, recorded pixel size and tray as an output destination inputted through the input section 124 in the setting mode where setting is made by the control section 126 in such a way that they can be updated.

The optimum recorded pixel size set in conformity to the reading pitch is as described above.

The supplementary information need not contain all the information for identifying the image generating apparatus (apparatus type), recording medium size and read pixel size. It is sufficient when at least one of the apparatus type, recording medium size and read pixel size is included; then the read pixel size, recorded pixel size are obtained, and the writing pitch in the image recording section 29 can be determined. It is also possible to make such arrangements that the apparatus type is identified in response to the information on the radiographed site included in the supplementary information and recorded pixel size is obtained. In this case, the aforementioned table can be configured to store only the preferable recorded pixel size conforming to various type of information contained in the supplementary information.

Based on one or more of the sized of the recording medium specified as an output destination, radiographed site and image generating apparatus identification information contained in the aforementioned supplementary information, the control section 126 acquires the tray as output destination from the table 261. Then the control signal for feeding the recording medium from the acquired tray is outputted to the tray selection section 127. Alternatively, the control section 126 acquires the tray as an output destination inputted through the input section 124, and outputs the control signal to the tray selection section 127.

Based on the control signal inputted from the control section 126, the sheet feed section 127 selects either the tray T1 or tray T2, and sends the selection signal to the sheet feed section 128.

The sheet feed section 128 is provided with two trays; T1 and T2. It is assumed that the tray T1 is loaded with the recording medium of 8×10-inch size, while the tray t2 is loaded with the recording medium of 14×17-inch size. The sheet feed section 129 selects the tray specified out of trays T1 and T2, in response to the selection signal outputted from the tray selection section 127, and feeds the recording medium loaded on the selected tray to the image recording section 127. The number of trays mounted on the sheet feed section 129 and the size of the recording medium to be loaded can be determined as required, without being restricted to this description.

The recording medium stored in the sheet feed section 128 is made of a photosensitive development recording material or photosensitive thermal development recording material.

Upon being exposed to light, this recording medium causes the photocatalyst such as photosensitive silver halide to form a latent image. When heated, the silver of the organic silver halide migrate ionized by the action of the reducing agent migrates, and bonds with the photosensitive silver halide to form a crystalline silver and hence an image.

The image recording section 129 consists of a thermal recording apparatus using an X-ray laser or a heat mode laser, for example. The recording medium is exposed to the laser beam modulated in response to the medical image data inputted from the image processing section 123 so that a latent image is formed. Color is developed on the exposed portion by subsequent overheating so that the latent image is made visible. By allowing the diameter of the laser beam outputted to be adjusted in conformity to the control by the control section 126, the image recording section 129 switches the writing pitch until the recorded pixel size will be 43.75 or 25 microns, and record the medical image.

The HIS/RIS 40 is an information system constructed via the network in the hospital, and is composed of a server for overall control of the system, a terminal, database and others. To put it more specifically, the HIS/RIS 40 receives an order for scanning a medical image and manages the examination data and the scanned medical image.

The following describes the image recording apparatus 10B. The image recording apparatus 10B has approximately the same configuration as the image recording apparatus 10A described above. For the same portions, therefore, illustration and detailed explanation will be omitted. The image recording apparatus 10B is structurally characterized in that the control section 126 is equipped with a RAM (not illustrated), which contains a table for storing a read pixel size corresponding to various types of information contained in the supplementary information of the DICOM, recorded pixel size and tray as an output destination.

FIG. 26 shows an example of the data configuration of the table 262. As shown in FIG. 26, the table 262 stores recording medium size, read pixel size, recorded pixel size and tray as an output destination in conformity to the apparatus type. For example, the recording medium size is 11×14 inches in all cases, independently of the apparatus type. The read pixel size is 87.5 microns when the apparatus is CR, MRI and CR, and 50 microns when the apparatus is a mammographic apparatus. The recorded pixel size is 43.5 microns when the apparatus is CR, MRI and CR, and 25 microns when the apparatus is a mammographic apparatus. The tray as an output destination is Tray 4 when the apparatus is CR, MRI and CR, and Tray 3 when the apparatus is a mammographic apparatus.

The sheet feed section 128 has two trays; T3 and T4. It is assumed that the trays T3 and T4 are loaded with recording medium of 11×14-inch size and the recording mediums in the tray T3 and T4 are different in the density that allows recording. Normally, the medical image scanned by mammography is required to provide outputs of higher definition than the medical image scanned by modality. It is further assumed that the recording medium of higher density is preferred. Thus, the tray T3 is loaded with a recording medium of higher density for higher definition, as compared with the normal recording medium, and tray T4 is loaded with the recording medium having the density used for general medical image.

When the image recording section 129 adjusts the diameter of the laser beam outputted in conformity to the control by the control section 126 to record a medical image on the recording medium fed from the tray T3, the image recording section 129 switches the writing pitch so that the recorded pixel size will be 43.75 microns. When the medical image is recorded on the recording medium fed from the tray T4, the image recording section 129 switches the writing pitch so that the recorded pixel size will be 25 microns, whereby the medical image is recorded.

Based on the supplementary information of the DICOM, the JOB manager 31 manages the medical image among the image generating apparatuses 1a through 1e, the image recording apparatus 10 and a database (not illustrated). For example, when the medical image generated by an image generating apparatus not conforming to the DICOM Standard has been inputted, the JOB manager 31 generates supplementary information conforming to the DICOM Standard, and manages the medical image. Further, when the medical image generated by the image generating apparatuses 1a through 1e is recorded on the recording medium, the JOB manager 31 selects the image recording apparatuses 10A or 10B according to the supplementary information, and outputs the medical image to the image generating apparatus, whereby the medical image is recorded.

The WS5 is a network for building a CR-based network, and manages the image generating apparatuses 1d and 1e, the JOB manager 31 and others.

Figure 27:
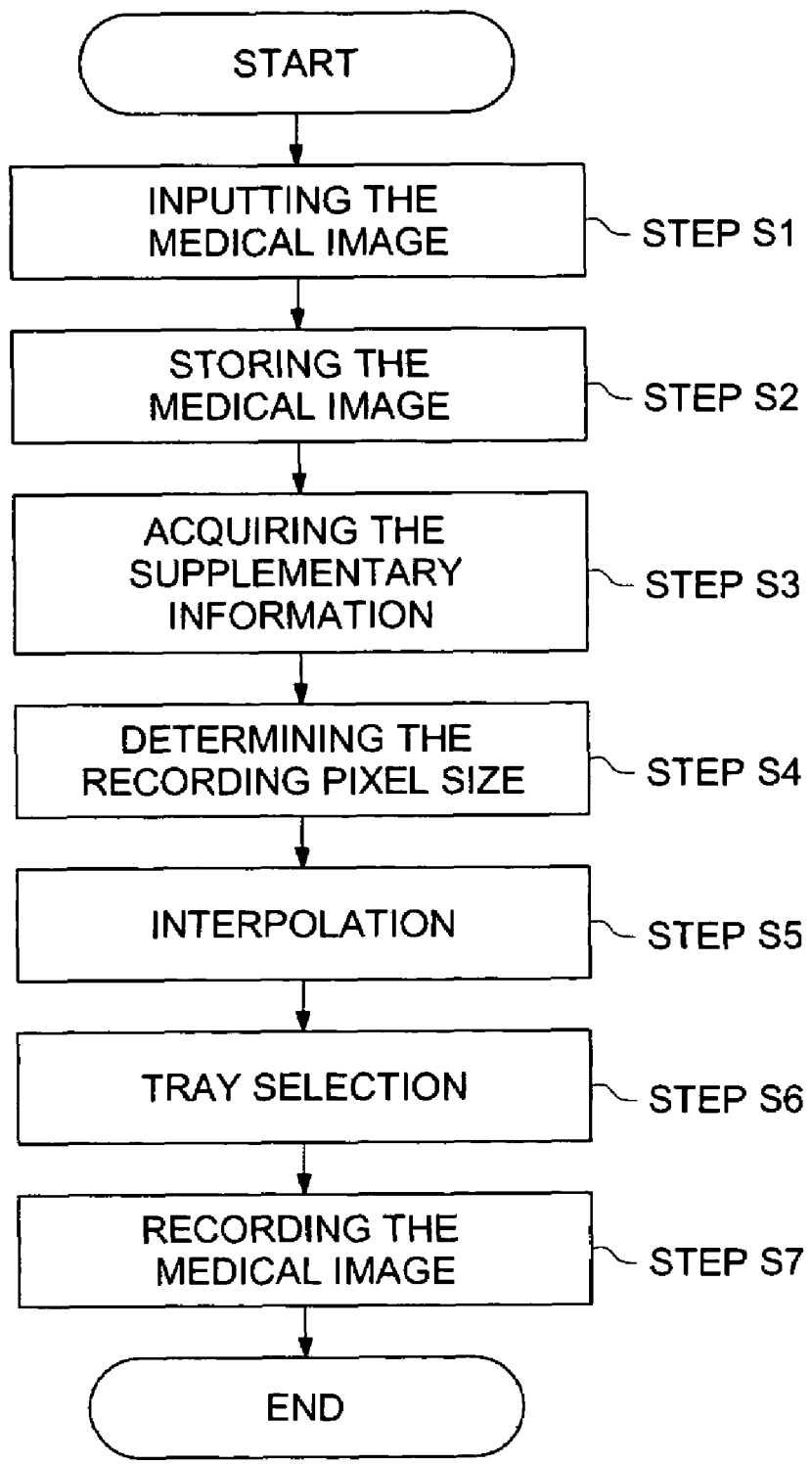
FIG. 27 is a flowchart representing the processing of medical image recording applied by the image recording apparatus 10.

The following describes the operation of the present embodiment:

FIG. 27 is a flowchart representing the processing of medical image recording applied by the image recording apparatus 10. As shown in FIG. 27, when a medical image has been inputted by the image data input section 121 (Step S27), the medical image is stored in the image data storage section 122 and is outputted to the control section 126 (Step S2). Then the supplementary information attached to the medical image is acquired by the control section 126 (Step S3), and the recorded pixel size is determined according to the acquired supplementary information and table 261 (or 262) (Step S4).

In the image recording apparatus 10A, the read pixel size or recorded pixel size is determined according to the table 261, and any one of the apparatus type, recording medium size or tray as an output destination in the supplementary information. Further, in the image recording apparatus 10A, the read pixel size or recorded pixel size is determined according to the table 262 and either the apparatus type or tray as an output destination.

Then the control section 126 controls the image processing section 123, and causes the medical image to be interpolated, based on the read pixel size or recorded pixel size (Step S5). Further, according to the supplementary information of the control section 126, the communication section 26 acquires the tray as an output destination from the table 261. It controls the tray selection section 127 and selects the tray (Step S6). To put it more specifically, the control section 126 of the image recording apparatus 10A gets the recording medium size contained in the supplementary information. If the recording medium has a 14×17-inch size, the control section 126 assumes the tray T2 as a tray as an output destination. Further, the communication section 26 of the image recording apparatus 10B gets the recording medium size contained in the supplementary information as well as the apparatus type. If the apparatus is a mammographic apparatus, it assumes the tray T3 as a tray as an output destination. The tray selection section 127 selects the tray, according to the control signal outputted from the control section 126, and feeds the recording medium from the selected tray.

The control section 126 controls the image recording section 129 and allows the recording medium exposed to the laser beam modulated in response to the medical image data inputted from the image processing section 123, according to the writing pitch conforming to the recorded pixel size, whereby medical image is recorded (Step S7). Then the control section 126 ejects the recording medium with the medical image recorded thereon, and terminates the processing of medical image recording.

As described above, according to the fourth embodiment, the image recording apparatus 10 gets the preferable recording pixel size conforming to the read pixel size, according to the supplementary information attached to the medical image and selects the writing pitch conforming to the recording pixel size, whereby the medical image is recorded on the recording medium.

The aforementioned arrangement ensures that the medical image generated by a plurality of image generating apparatuses 1*a* through 1*e* differing in read pixel sizes can be recorded on the preferable recording medium according to the recording pixel size, and provides high-precision medical image with high efficiency.

The aforementioned arrangement also determines the writing pitch of the medical image from the relationship between the read pixel size and recorded pixel size so as to minimize deterioration of image quality resulting fro interpolation carried out at the time of life-size outputting of a medical image, whereby the medical image is recorded. Thus, this arrangement provides high-precision medical image with high efficiency.

When the supplementary information does not include the read pixel size, the read pixel size is obtained from the tables 261 and 262, according to the output size of the as required recording medium contained in the supplementary information and the image generating apparatus identification information (apparatus type), and the preferable recording pixel size and writing pitch are determined. This configuration allows the medical image to be recorded by selecting the preferable writing pitch according to various types of information contained in the supplementary information, and provides a system characterized by excellent versatility.

The image recording apparatuses 10A through 10B is equipped with a plurality of trays, and the optimum tray is selected according to the read pixel size of the medical image generated in the image generating apparatuses 1*a* through 1*e*. The medical image can be recorded, using the recording medium loaded on the tray. When the medical image is outputted, this arrangement eliminates the possibility of an incorrect tray to be selected or the medical image being recorded on the recording mediums of different sizes or of different properties, and avoid a waste of the recording medium.

The fourth embodiment described above is only an example of a diagnostic support apparatus of the present invention, without the present invention being restricted thereto. By way of an example, the aforementioned present embodiment assumes that the image recording apparatus 10A has two trays T1 and T2 and switching is performed between two writing pitches for each tray or each size of the recording medium. It goes without saying that the size of the recording medium, the number of the trays, and the number of the switchable writing pitches can be set as desired, without the present invention being restricted to this configuration. Further, the image recording apparatus 10B has two trays—Trays T3 and T4—for loading recording mediums of the same size and different properties. Switching is performed between the writing pitches for each tray and the medical image is recorded. It goes without saying that the size and property of the recording medium, number of the trays and number of the switchable writing pitches can be set as desired, without the present invention being restricted to this configuration.

For example, the size of the recording medium can include 14×14-inch, 11×14-inch, 10×12-inch, 14×17-inch, 14×14-inch (life), 11×14-inch (life) and 8×10-inch (reduced) sizes, in addition to the aforementioned 14×17-inch and 8×10-inch sizes. Further, the trays can be provided in the number conforming to the number of the sizes of the recording mediums. The number of switchable writing pitches can be set in conformity to the number of the tray and the size of recording medium. For the property of the recording medium, switching is performed between the writing pitches in conformity to other various characteristics of the recording medium, in addition to density.

The greater the number of the switchable writing pitches, the more preferable medical image can be reproduced in conformity to the type of the image generating apparatuses la through 1*e*. The above description of the present embodiment, refers to the case of two writing pitches. If three writing pitches can be set, more preferable configuration is ensured. Alternatively, the greater the number of the switchable writing pitches, the less processing efficiency will result. Therefore, two modes are provided; one is the mode where the writing pitch is selected for each tray to record a medical image, and the other is the mode where one writing pitch is used for all trays to record a medical image, whereby the medical image is recorded by switching between these modes in conformity to the requirements of a user.

The aforementioned data configuration of the tables 261 and 262 loaded on the control section 126 is also an example. It is also possible to have association with various other types of information to store the read pixel size and recorded pixel size. Alternatively, it is sufficient if the recording pixel size, associated with various types of information, can be obtained. Further, it is also possible to make such arrangements that the recording pixel size is calculated by the control section 126 from the read pixel size and the size of the recording medium to which data is outputted, without the recording pixel size being stored.

It is also possible to arrange such a configuration that the image recording section 129 records the medical image according t the image signal outputted from the image processing section 123, and records the writing pitch. This configuration assists an engineer in finding out incorrect writing pitches quickly, and allows a doctor diagnosing the medical image to refer to the writing pitch.

Further, the details of the configuration in the components of the image recording apparatus 10 of the fourth embodiment as well as the details of the operations can be modified as appropriate, without departing from the spirit of the present invention.

What is claimed is:

1. A medical image recording system for recording a medical image on a recording medium, comprising:

an image generating apparatus system that forms image data including medical image data of a radiographed object and supplementary information; and an image recording apparatus that records the medical image based on the medical image data on the recording medium, wherein the image generating apparatus system comprises:

a first communication section for communicating with the image recording apparatus;

an image generating section for forming the medical image data of the radiographed object; and a first control section for controlling the image generating section to form the medical image data at a predetermined reading pitch, adding information for deciding a writing pitch to be used in recording the medical image based on the medical image data, to the supplementary information; and sending the image data to the image recording apparatus through the first communication section; and wherein the image recording apparatus comprises:

a second communication section for communicating with the image generating apparatus system;

an image recording section for recording an image of the image data; and a second control section for receiving the image data from the image generating apparatus system through the second communication section; calculating an interpolation magnification factor from an image of the medical image data to the image of the image data to be recorded, for each of a plurality of writing pitches based on the supplementary information; and determining the writing pitch to be used to record the image of the image data, among the plurality of writing pitches, based on the calculated interpolation magnification factor; and controlling the image recording section to record the image of the image data at the determined writing pitch.

2. The medical image recording system of claim 1, wherein the first control section determines the predetermined reading pitch by selecting from a plurality of reading pitches.

3. The medical image recording system of claim 1, wherein the image data forming section comprises a plurality of image apparatuses and a plurality of reading pitches over the apparatuses.

4. The medical image recording system of claim 1, wherein only when there exists such a writing pitch that the reading pitch is an integral multiple of the writing pitch among the plurality of writing pitches, the second control section selects the writing pitch.

5. The medical image recording system of claim 1, wherein only when there is such a writing pitch among the plurality of writing pitches that an interpolation magnification factor obtained by dividing the reading pitch of the image generating apparatus system by the writing pitch is an integer, the second control section selects the writing pitch to be used to record the image of the image data.

6. The medical image recording system of claim 1, wherein the image generating apparatus system is connected with the image recording apparatus through a network.

7. The medical image recording system of claim 1, wherein the image recording apparatus comprises a plurality of image recording apparatuses and a plurality of writing pitches over the plurality of image recording apparatuses, and further comprises a management section connected with the image generating apparatus and the image recording apparatuses, wherein the management apparatus comprises:

a management side communication section for communicating with the image generating apparatus and image recording apparatuses;

a management side control section for receiving image data from the image generating apparatus through the management side communication section, determining selecting the writing pitch to be used in recording the image of the image data from a plurality of writing pitches, based on the supplementary information, determining the image recording apparatus corresponding to the selected writing pitch among the recording apparatuses and sending the image data to the determined image recording apparatus through the management side communication section.

8. The medical image recording system of claim 7, wherein the management side control section determines the image recording apparatus corresponding to the writing pitch of this combination, when there is a combination between the reading pitch and writing pitch such that the reading pitch of the image generating apparatus is an integral multiple of writing pitch of the image recording apparatus.

9. The medical image recording system of claim 7, wherein the management side control section determines the writing pitch to be used to record the image of the image data, based on the interpolation magnification factor from the formed image to the recorded image, and determines the image recording apparatus corresponding to the writing pitch.

10. The medical image recording system of claim 7, wherein the management side control section determines the image recording apparatus corresponding to the writing pitch of this combination, when there is a combination between the reading pitch and interpolation magnification factor such that the value obtained by dividing the reading pitch of the image generating apparatus by the interpolation magnification factor is an integral multiple.

11. The medical image recording system of claim 7, wherein the image generating apparatus and image recording apparatus are connected through a network.

12. The medical image recording system of claim 7, wherein there is a combination between the image generating apparatus and the image recording apparatus that one reading pitch of the image generating apparatus is an integral multiple of one writing pitch of the image recording apparatus.

13. The medical image recording system of claim 1, wherein there is a combination of the reading pitch and the writing pitch so that the interpolation magnification factor obtained by dividing the reading pitch of the image generating apparatus system by the writing pitch is an integer.

14. The medical image recording system of claim 1, wherein the supplementary information includes at least one of radiographing condition information indicating radiographing conditions of the object, usage information of the image data, reading pitch information of the image generating apparatus system having formed the image data, and information on the interpolation magnification factor of the image data.

15. The medical image recording system of claim 1, wherein the plurality of writing pitches are two or more different types of writing pitches where $P1<P2<\ldots<Pn$ ($n\geq 2$), and $1.0<(Pi/P1)<1.9$ is satisfied in at least one of i ($i=2, 3, \ldots, n$).

16. The medical image recording system of claim 15, wherein $1.1<(Pi/P1)<1.7$ is satisfied at least one of i ($i=2, 3, \ldots n$).

17. The medical image recording system of claim 1, wherein The multiple writing pitches include at least three writing pitches.

18. The medical image recording system of claim 1, wherein the second control section conducts the image recording apparatus to record the writing pitch used to record the image of the image data, together with the image of the image data, on the recording medium.

19. The medical image recording system of claim 1, wherein the image recording apparatus records the image of the image data on a recording medium using a photothermal silver halide material as the recording medium.

20. The medical image recording system of claim 1, wherein the image generating apparatus system comprises a plurality of image generating apparatuses and the second control section comprises:

a setting section for setting the writing pitch for each image generating apparatus of the image generating apparatus system to be used to record the image, selected among the plurality of writing pitches, as writing pitch information for each image generating apparatus for forming image data;

a determining section for determining the writing pitch to be used to record the image of the image data, based on the writing pitch information for the image generating apparatus set by the setting section and the supplementary information including information on a type of the image generating apparatus having formed the inputted image data; and wherein the second control section controls the image recording apparatus to record the image of the image data according to the writing pitch determined by the determining section.

21. The medical image recording system of claim 20, wherein the image recording apparatus further comprises:

a storage section for storing the writing pitch information for the image generating apparatus set by the setting section in a form associated with each of the image generating apparatus, wherein the determining section determines the writing pitch to be used to record the image of the image data, based the writing pitch information for the image generating apparatus stored by the storage section and the supplementary information including the information on the type of the image generating apparatus having formed the inputted image data.

22. The medical image recording system of claim 20, wherein the second control section further comprises:

a mode setting section for setting either a variable writing pitch mode for determining the writing pitch in response to the information on the type of the image generating apparatus, or a fixed writing pitch mode for determining a predetermined writing pitch independently of the information on the type of the image generating apparatus, wherein the determining section determines the writing pitch to be used to record the image of the image data, based on a mode set by the mode setting section, the writing pitch information for the image generating apparatus set by the setting section, and the information on the type of the image generating apparatus of the image generating apparatus where the image data has been inputted.

23. The medical image recording system of claim 20, wherein the setting section sets the writing pitch information for the image generating apparatus for a plurality of writing pitches with respect to at least one type of image generating apparatus, and wherein when the writing pitch information for the image generating apparatus shows a plurality of writing pitches based on the information on the type of the image forming apparatus, the determining section determines the writing pitch to be used to record the image of the image data, selected from the plurality of the writing pitches based on other information among the information for deciding the writing pitch.

24. The medical image recording system of claim 1, wherein the information for deciding a writing pitch includes at least one of radiographing condition information indicating radiographing conditions of the object, usage information of the image data, reading pitch information of the image generating apparatus system having formed the image data, and information on the interpolation magnification factor of the image data.

\* \* \* \* \*